(12) United States Patent
Derry et al.

(10) Patent No.: US 8,214,320 B2
(45) Date of Patent: Jul. 3, 2012

(54) LITIGATION COST MANAGEMENT SYSTEM

(76) Inventors: Michael L. Derry, Bloomfield Hills, MI (US); Thomas J. Foley, Northville, MI (US)

(*) Notice: Subject to any disclaimer, the term of this patent is extended or adjusted under 35 U.S.C. 154(b) by 1891 days.

(21) Appl. No.: 10/517,287

(22) PCT Filed: Jun. 11, 2003

(86) PCT No.: PCT/US03/18259
§ 371 (c)(1),
(2), (4) Date: Dec. 8, 2004

(87) PCT Pub. No.: WO03/105081
PCT Pub. Date: Dec. 18, 2003

(65) Prior Publication Data
US 2005/0203814 A1 Sep. 15, 2005

Related U.S. Application Data

(60) Provisional application No. 60/387,666, filed on Jun. 11, 2002.

(51) Int. Cl.
*G06N 5/00* (2006.01)

(52) U.S. Cl. .......................... 706/62; 706/45

(58) Field of Classification Search .................. 705/30, 705/34; 706/62, 45; 345/440
See application file for complete search history.

(56) References Cited

U.S. PATENT DOCUMENTS

| 5,537,524 | A | * | 7/1996 | Aprile | 345/440 |
| 5,583,778 | A | * | 12/1996 | Wind | 705/34 |
| 5,799,286 | A | * | 8/1998 | Morgan et al. | 705/30 |
| 6,622,128 | B1 | * | 9/2003 | Bedell et al. | 705/30 |

* cited by examiner

*Primary Examiner* — Wilbert L Starks
(74) *Attorney, Agent, or Firm* — Douglas P. LaLone; Rader Fishman & Grauer

(57) ABSTRACT

The litigation cost management system (FIG. 1) provides modules for outlining the process of litigation (12), establishing pricing variables to each step of the litigation (14), all at the outset of the case. A case budget (16) is then generated and the case is managed by outside counsel based upon the agreed upon budget and process. When exceptions occur during the course of litigation, outside counsel electronically submits requests for new work to corporate counsel, which in turn can be approved or denied. Point and click billing allows immediate simplistic invoicing which requires no review by corporate counsel as the work performed has already been approved. Statistical reporting provides corporate counsel with real time analysis of all the cases that are in the system.

24 Claims, 27 Drawing Sheets

Inside Counsel
(New Case Budget Development)
-Change to Defaults Reflected in Total

BUDGET & LITIGATION WORKSHEET

| Claimant: | Venue: | Date Filed: | Triage No: |
|---|---|---|---|
| Renger, Joseph | Orange California | February 7, 2002 | II |
| Date of Loss: | Responsible Defense Counsel/Firm: | | Type of Case: |
| June 23, 2000 | George McIntyre / Park & Fine | | Heart Valve / Stroke |

| TASK DESCRIPTION | Budgeted Fees | | Budgeted Expense | Enter Budget |
|---|---|---|---|---|
| L320 Document Production | $ 240 | | $ 300 | |
| L330 Depositions | $ 2,200 | | $ 320 | |
| L340 Expert Discovery | $ 3,800 | | $ 450 | |
| L350 Discovery Motions | $ 1,566 | | | |
| L390 Other discovery | | | | |
| Trial Preparation & Trial | | | | |
| L410 Fact witnesses | | | | |
| L420 Expert witnesses | | | | |
| L430 Written motions & submissions | | | | |
| L440 Other trial preparation & support | | | | |
| L450 Trial & hearing attendance | | | | |
| L460 Post- trial motions & submissions | | | | |
| L470 Enforcement | | | | |
| Trial Preparation & Trial | | | | |
| L410 Appellate motions & submissions | | | | |
| L420 Appellate briefs | | | | |
| L430 Oral Argument | | | | |

Budget $ 27,308  Litigation Totals  $ 17,928   $ 9,380

Submit

Outside Counsel
(Initial New Case Budget)
3 of 11

Budget & Litigation Worksheet

| Claimant: | Venue: | Date Filed: | Triage No: |
|---|---|---|---|
| Renger, Joseph | California, Orange | February 7, 2002 | II |
| Date of Loss: | Responsible Defense Counsel/Firm: | | Type of Case: |
| June 23, 2000 | George McIntyre / Park & Fine | | Heart Valve / Stroke |

| Code | Task Description | Budget Fees | Budget Expense | Total Budget |
|---|---|---|---|---|
| Case Assessment, Development & Administration | | | | |
| L110 | Fact investigation/development | $ 4,200 | $ 200 | $ 4,400 |
| L120 | Analysis/strategy | $ 1,200 | - | $ 1,200 |
| L130 | Experts/Consultants | $ 1,080 | $ 8,500 | $ 9,580 |
| L140 | Documents/file management | - | - | - |
| L150 | Budgeting | - | - | - |
| L160 | Settlement/ADR | - | - | - |
| L190 | Other case assessment, development & administration | $ 600 | - | $ 600 |
| Pretrial Pleadings & Motions | | | | |
| L210 | Pleadings | - | - | - |
| L220 | Preliminary injunctions/provisional remedies | $ 90 | - | $ 90 |

Inside Counsel
(Response to New Case Budget)
–Change Request

PENDING BUDGET & LITIGATION WORKSHEET

Claimant: Renger, Joseph
Venue: Orange, California
Date Filed: February 7, 2002
Triage No:

Date of Loss: June 23, 2000
Responsible Defense Counsel/Firm: George McIntyre / Park & Fine
Type of Case: Heart Valve / Stroke

| TASK DESCRIPTION | Budgeted Fees | Requested Fees | Budgeted Expense | Requested Expense |
|---|---|---|---|---|
| L390 Other discovery | | | | |
| Trial Preparation & Trial | | | | |
| L410 Fact witnesses | | | | |
| L420 Expert witnesses | | | | |
| L430 Written motions & submissions | | | | |
| L440 Other trial preparation & support | | | | |
| L450 Trial & hearing attendance | | | | |
| L460 Post-trial motions & submissions | | | | |
| L470 Enforcement | | | | |
| Trial Preparation & Trial | | | | |
| L410 Appellate motions & submissions | | | | |
| L420 Appellate briefs | | | | |
| L430 Oral Argument | | | | |
| Litigation Totals | $ 17,928 | $ 18,437 | $ 9,380 | $ 9,380 |

Original Budget $ 27,308
New Budget $ 27,817

[Accept] [Modify and Resend] [Reject]

Inside Counsel
(Case Information)
-Drill Down
-4 of 7

☐ Select an open case

Case Selection

Case Status [Type of Case ▼]

Case Status [Products Liability ▼]

Products liability [Heart Valve ▼]

Heart Valve (Injury) [Stroke ▼]

Search

[Search]

238

| Claimant (Stroke) | Location | Firm | Lawyer |
|---|---|---|---|
| Able, John | Milwaukee, WI | VanDuessen, Moon | John Mitchel |
| Ackeley, Robert | Omaha, NE | Johnson | Maria Sauer |
| Anderson, Mary | Madison, WI | VanDuessen, Moon | John Mitchel |
| Andrews, William | Phoenix, AZ | James, Pepper | Wayne Aden |
| Bailey, Merlyn | Dallas, TX | May and May | Robert Olson |
| Balder, Julie | Chicago, IL | Baker, James | Richard Goth |
| Booker, Kess | Berkley, CA | Hyatt West | Douglas Doud |
| Damon, Dennis | Naperville, IL | Baker, James | Anne Billings |
| Dorans, John | Littleton, CO | Gossell, Wright | Gary Nert |
| Eger, Robert | Minneapolis, MN | White, Dey | Becky Peterson |
| Emerson, Martha | Findlay, OH | Thomson, Jerrit | Patrick Hampton |
| Ewald, Gretchen | Champagne, IL | Baker, James | Anne Billings |
| Fenda, Ivan | Atlanta, GA | Patterson, Gibbs | Joel Klehn |
| Flaherty, John | Sarasota, FL | Hines Walter | Dennis Fuller |
| Fleel, Marl | Toledo, OH | Thomson, Jerrit | Charles Handley |
| Fox, Michael | San Diego, CA | Hyatt West | Sean Goodsley |
| Gleason, Lynn | Columbus, OH | Thomson, Jerrit | Patrick Hampton |
| Henko, Mark | Holland, MI | Claymore, Gray | David Ericson |
| Hoag, Edward | Fresno, CA | Hyatt West | Robert Clark |
| Hudson, Thomas | Roselle, WI | VanDuessen, Moon | Kathleen McNeil |
| Jones, George | Houston, TX | Perk & Fine | George McIntyre |
| Johnson, James | Detroit, MI | Claymore Gray | Gary Zahn |
| Koerner, Sharon | Miami, FL | Rather, Jones | Thomas Glass |
| Kitzer, Terry | Wexford, MO | Westbrock | Richard Toyra |
| Kitchen, Mark | Springfield, OH | Thomson, Jerrit | Patrick Hampton |
| Klahn, Joseph | Union City, GA | Patterson Gibs | Jean Gertz |
| Kohn, Laura | Green Bay, WI | VanDuessen, Moon | Kathleen McNeil |
| Krost, Joanne | Birmingham, AL | Stockman | James Olse |
| Laurich, Michael | Germantown, TN | German Miller | Bruce Sacks |
| Lehmann, John | Baton Rouge, LA | Radio and Tons | James Givens |
| Lewren, David | Syracuse, NY | Seylour, Ginns | Vincent Raed |
| Linne, Peter | Green Bay, WI | VanDuessen, Moon | John Mitchel |
| Lynch, Margaret | Lagrange, IL | Baker, Jones | Anne Billings |
| Macdade, Faith | Madison, WI | VanDuessen, Moon | John Mitchel |

FIG - 17

Outside Counsel
(Initial New Case Budget)
-9 of 11

Budget & Litigation Worksheet

| Claimant: | Venue: | Date Filed: | Triage No: |
|---|---|---|---|
| Jones, George | Texas, Houston | April 25, 2002 | II |
| Date of Loss: | Responsible Defense Counsel/Firm: | | Type of Case: |
| June 15, 2000 | George McIntyre / Park & Fine | | Heart Valve / Stroke |

| Code | Task Description | Budget Fees | Budget Expense | Invoiced | Remaining |
|---|---|---|---|---|---|
| L440 | Other trail preparation & Support | | | | |
| L450 | Trial & hearing attendance | | | | |
| L460 | Post-trial motions & submissions | | | | |
| L470 | Enforcement | | | | |
| L510 | Appellate motions & submissions | | | | |
| L520 | Appellate briefs | | | | |
| L530 | Oral argument | | | | |
| | Litigation Totals | $ 19,375 | $ 9,380 | $ 836 | $ 27,919 |
| | Total Budget $ 28,755 | | | | |

Alert - Action Item

Inside Counsel
(Exception Request)
-Review

⚠ High Priority Alert...

George McIntyre, PC
Matter # 20030849

Plaintiff has amended complaint to add claim for neurological deficits due to anoxia from heart valve failure. Recommend and request retain neuropsychologist for record review and possible IME and submit IME request to Plaintiff.

Received May 24, 2003 - 3:34:23 PM EST

| Close |
|---|
| Next Item |

High: 2  2 of 2
Medium: 7
Low: 13

| Exception Request | Current Budget | | Requested Budget | |
|---|---|---|---|---|
| Meeting with Expert Witness | 2 | $390 | 2 | $390 |
| Expenses | 0 | $0 | 2 | $1170 |
| | 0 | $0 | 1 | $5000 |
| Independent Medical Exam | | | | $50 |
| Totals | | $780 | | $6220 |

| Deny | Approve | Modified |
|---|---|---|

Exception Categories
- Additional Expenses
- Additional Items
- New Item

View entire Budget

FIG - 27

LITIGATION COST MANAGEMENT SYSTEM

This application is based on and claims priority in U.S. Provisional Patent Application 60/387,666 filed Jun. 11, 2002.

FIELD OF THE INVENTION

The present invention relates generally to a litigation process cost control management system for use by corporate counsel that manages substantial case loads, more specifically, an interactive real time system to be used between corporate counsel and with law firms where there is a need to add efficiencies and to standardize, streamline, facilitate, and control the cost of the litigation process.

BACKGROUND AND SUMMARY OF THE INVENTION

Traditionally litigation management involves the client, corporate counsel, calling the outside counsel or law firm and informing them they have a problem that needs to be resolved. If the problem is a suit that has been filed against the company, then a firm is retained and the defense begins. Often large corporations will have massive litigation budgets established in order to defend the company in the 100's of cases that are pending at any one given time. In massive tort litigation, a company could have 100's of cases pending in different states, counties and jurisdictions. This requires multiple firms and lawyers to be retained in order to handle the cases. As a result, corporate counsel is subjected to the different management styles, the jurisdictional nuances, and the different billing and invoicing practices for each law firm.

The invoicing and billing systems for each of the law firms that corporate counsel retains may vary which results in inefficiencies for both corporate counsel and for law firms. Typically, a lawsuit begins with commencement of an action by filing a complaint, then settlement negotiations may occur, and if they are not successful, then the case proceeds. The next step involves the parties commencing discovery on one another and on non-parties. Motion practice can begin before or after discovery depending upon posturing of the parties. After motion practice is completed, the case either settles or goes to trial.

The management of this process varies from law firm to law firm, often depending on the type of suit and the skill and experience of the attorneys working on the case. The cost of the suit accordingly varies because different attorneys have different management styles. Some attorneys may prefer to use experts, some may not, some may prefer extensive motion practice, some may not, some may rely heavily on depositions, and some firms may not take any depositions at all. These varying practices lead to inconsistencies of how corporate counsel deals with the various law firms it may retain. For example, if a corporation is defending itself against mass tort litigation cases that are pending in various states around the country, then law firms in each of those states would be retained. The attorneys in each of those firms will have different hourly rates, will have different experience levels, and will vary on how long they take to draft motions, prepare for hearings and depositions, etc. This causes unpredictability for budgeting purposes, something corporations would like to overcome.

Traditionally, the invoicing and billing for litigation is done either on a fixed fee arrangement, a contingency fee arrangement, or on a pay as you go, or hourly, arrangement where invoices are generated each month, and, hopefully paid. Each of these fee arrangements has drawbacks that could affect the relationship with counsel and the quality of the representation and the cost of the litigation.

Fixed fee arrangement requires the parties to establish a fixed fee amount at the outset of the case. With this type of arrangement, the work that is performed and the hours that are billed are recorded and tracked during litigation. Often, workload is adjusted based upon cost averaging. This type of fee arrangement runs the risk of being result oriented as the firm may be less inclined to be as effective if it sees the work is exceeding the time allotted in the fixed fee arrangement. Fixed fee arrangements can also result in other inefficiencies which affect the quality of the work and negatively affect the outcome of the case.

Contingency fee arrangements likewise have certain inefficiencies which may negatively affect the outcome of the case. For example, if the case continues and it is later realized that the outcome is going to bring little value, the quality of services rendered could decrease or cease all together. Other inefficiencies may occur with this arrangement resulting in a less than desirable outcome. On the other hand, if it is realized that the outcome of the case will yield abnormally high results, then the firm may realize an unfair return on their efforts to the client's dismay.

The standard pay as you go fee arrangement involves performing the work on a monthly basis and invoicing same shortly thereafter. In the traditional litigation invoicing and billing arrangement, a client would be advised as to the litigation process and, after the appropriate investigation, the case would begin. As the work is done, the time and cost are logged in on a daily basis. At the end of each month an invoice is created which summarizes the time and costs along with a description of services that were rendered. The invoice is then reviewed by the partner, corrected where necessary which requires steps back and forth with the typist, to where it is then finalized. Once finalized, the invoice generally goes through an auditing process in an accounting department of the law firm for verification with the firm's billing system.

If a firm's accounting department finds a problem, the invoice goes back to the billing attorney for correction and then goes through the system one more time. However, if the invoice passes scrutiny the first time, and is electronically sent, or is placed in an envelope, postage is applied to the envelope, and it is sealed and then forwarded to corporate counsel whose company receives it in a few days. Once the company receives the invoice, it goes to their accounting department to be logged in to the system. Thereafter, the invoice is forwarded to the corporate attorney that is in charge of that particular case, for review, critique, approval or disapproval. This requires corporate counsel to set aside the time for this step, which slows down the collection process. If the invoice does not comply with corporate counsel's billing standards, or otherwise is not acceptable, then the invoice could be rejected and possibly returned to the billing attorney for correction. Worse yet, the invoice could be put in the 'to deal with later' pile and it may sit for a lengthy period before being resolved. For the firm, this delay reduces cash flow, minimizes realization on the account and the entire process increases the cost of doing business for both in-house counsel and outside counsel.

However, once the invoice passes corporate counsel's review, the invoice is sent to the company's billing department for payment. In many instances payment is not even scheduled until thirty (30) days after the aforementioned process has been completed. Once the draft for paying the invoice has been cut, it too may set and then be put into an envelope, sealed, postage applied thereto, and sent off to the law firm. This requires yet additional steps by the law firm because it now has to reconcile the check with its own internal accounting system and then have the check deposited with the bank.

The aforementioned process can further be delayed if the charges billed on the invoice were not approved by corporate counsel. Worse yet, is when the work has been previously approved by corporate counsel, but the company now refuses to pay for the work after it has been completed. Thus, in the traditional litigation arrangement where the client pays as the work is done, significant steps are involved which can lead to inefficiencies, re-work disputes over billing, wasted time in the billing and invoicing process, loss of realization of time and money, and long periods before payment is ever made or received.

There are other problems with the traditional style of billing the client after the work has been. For example, controlling costs of litigation after the work has been performed, is inherently problematic. For law firms working on an hourly rate, there is little incentive in the system to be efficient. The result is that a firm may invoice for their inefficiencies and non-value added steps, which the client may not become aware of until after the work is completed and the invoice has already been sent to the client. It would be preferred to provide a litigation cost control management system that allows corporate counsel to control fees at their point of origin, that is, when the work is being performed. It would also be preferred to provide a methodology of managing the cost of litigation that controls the unit of time and the value of the activity, which would allow for automatic enforcement and compliance with the companies litigation guidelines, with little or no associated monitoring costs.

It would also be desirable to provide a litigation cost control management system that is much more than just a billing system, but instead an efficient cost control device that removes waste in the litigation process, surprises to the client, yet yields high quality legal services at predictable costs. The system allows the client to have complete control over the litigation process. The present invention accomplishes this objective through implementing cost containment and control, by accurately and continuously updating the case activity and the litigation budget through real time communications between inside counsel and outside counsel.

Another embodiment of the present invention provides a cost management system that allows for exceptions to be made during the case that can be immediately approved and added to the billing system with ease. Cost based decision making allows for continuous updates and allows corporate counsel to know at any given time, the cost, and status of the litigation without ever needing to pick up the phone and contact outside counsel. One aspect of the invention allows costs to be captured when the work is done, thus allowing the billing partner or other appropriate firm personnel to point and click in order to electronically invoice the client at any time. Thus, there is no need for the law firm or corporate counsel to review the invoice because the work has been previously approved.

Another embodiment of the present invention eliminates the need for corporate counsel to approve items on invoices, eliminates any up-time charges, eliminates any re-work, eliminates over billing and payments for any of the inefficiencies as a result of the firm. This is accomplished by utilizing litigation process maps that allow for task value pricing at the outset of the case in order to establish a budget.

One of the embodiments of the present invention provides a point and click invoicing system that automatically sends a current invoice to general counsel's accounting department. It would be desirable to immediately transfer the required funds from the corporation to the firm's bank account, thus eliminating several days of delays and effort. The present invention accomplishes this task because the work performed has been previously approved at the amount agreed upon, and thus, the standard inefficiencies in the system are removed.

Another embodiment of the present invention provides a cost based decision making litigation process management system that allows for capturing immediate application of the best practices of all law firms that are within the system. Yet another embodiment of the present invention allows inside counsel to be able to award bonuses to a firm that does exceptional work by allowing corporate counsel to add a variance to the predetermined budget.

Another embodiment of the present invention provides a system with changeable variances, for each task performed by the firm in order to assist in budgeting at the outset of the case. The system also accommodates projected expenses, and allows corporate counsel to approve a budget, or reject it with alternatives, and then to have the outside law firm approve the budget. One aspect of the present invention would provide for exceptions to the budget, with prior approval and would automatically update the system so that real-time data can be obtained as to the current costs of each case.

Another embodiment of the present invention provides statistical analysis of the performance of each law firm that is in the company's database.

DESCRIPTION OF THE FIGURES

FIG. 12 is a screen printout from the litigation cost management system illustrating a budget and litigation worksheet prepared for submission to outside counsel;

FIG. 13 illustrates a screen output for outside counsel to review the budget;

FIG. 15 illustrates a screen printout from the litigation cost management system from inside counsel's perspective, showing the change request from outside counsel, prior to the budget being accepted;

FIG. 16 illustrates a screen output from the litigation cost management system from corporate counsel's perspective, illustrating some of the cases in the system;

FIG. 17 illustrates a screen output for the present invention from outside counsel's perspective, and depicting a current case budget status;

FIG. 27 illustrates a screen output from the litigation cost management system from inside counsel's perspective, showing the exception requested.

DETAILED DESCRIPTION OF THE PREFERRED EMBODIMENTS

Figure 1:
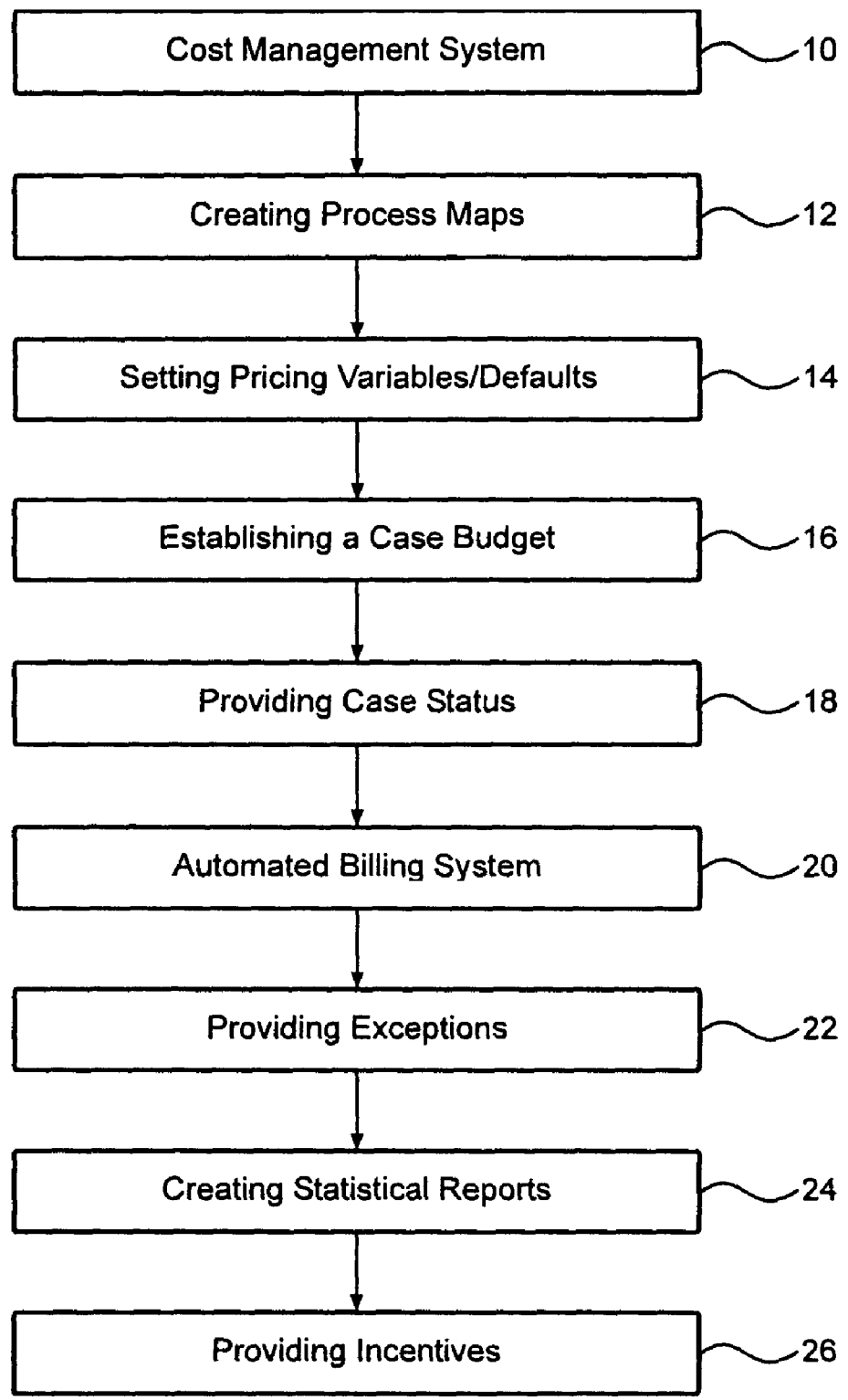
FIG. 1 is a flow chart illustrating the eight basic areas or modules of the litigation cost management system.

The Litigation Cost Management System 10 is PC based and allows corporate counsel to communicate through the internet with outside counsel. The Management System 10 operates using preferably eight different modules that are interconnected for processing various aspects of the system. The System 10 includes a creating process maps module 12, setting pricing variables and defaults module 14, a case budget module 16, a case status module 18, automated billing system module 20, an exceptions module 22, a statistical reporting module 24, and an incentives module 26. These modules collectively define the Litigation Cost Management System which allows corporate counsel to effectively manage litigation and its associated costs, when the work is being done. It will be appreciated that the number of modules can vary, without departing from the present invention.

Figure 2:
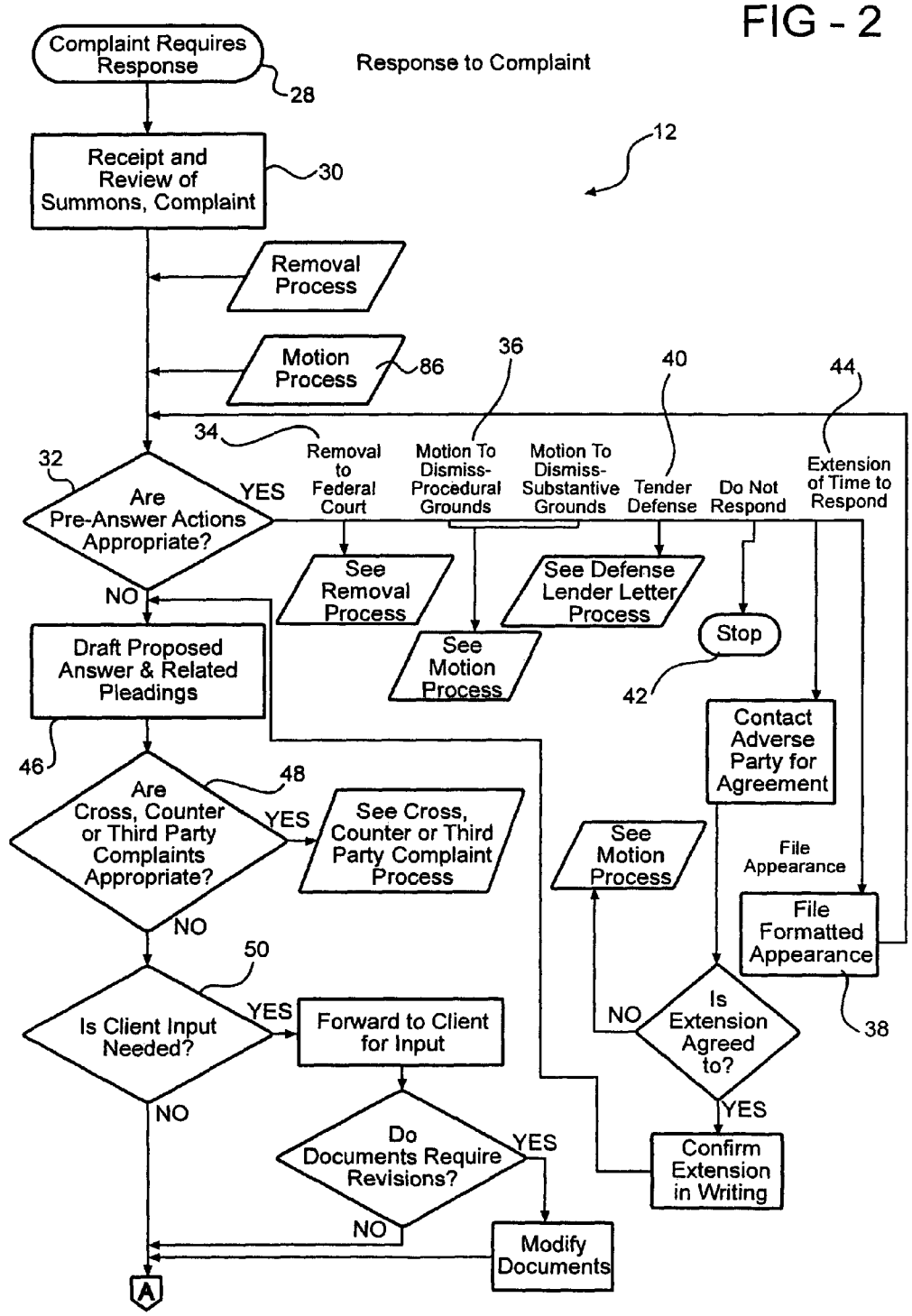
FIG. 2 illustrates a process map for the steps involved in responding to a complaint.
Figure 3:
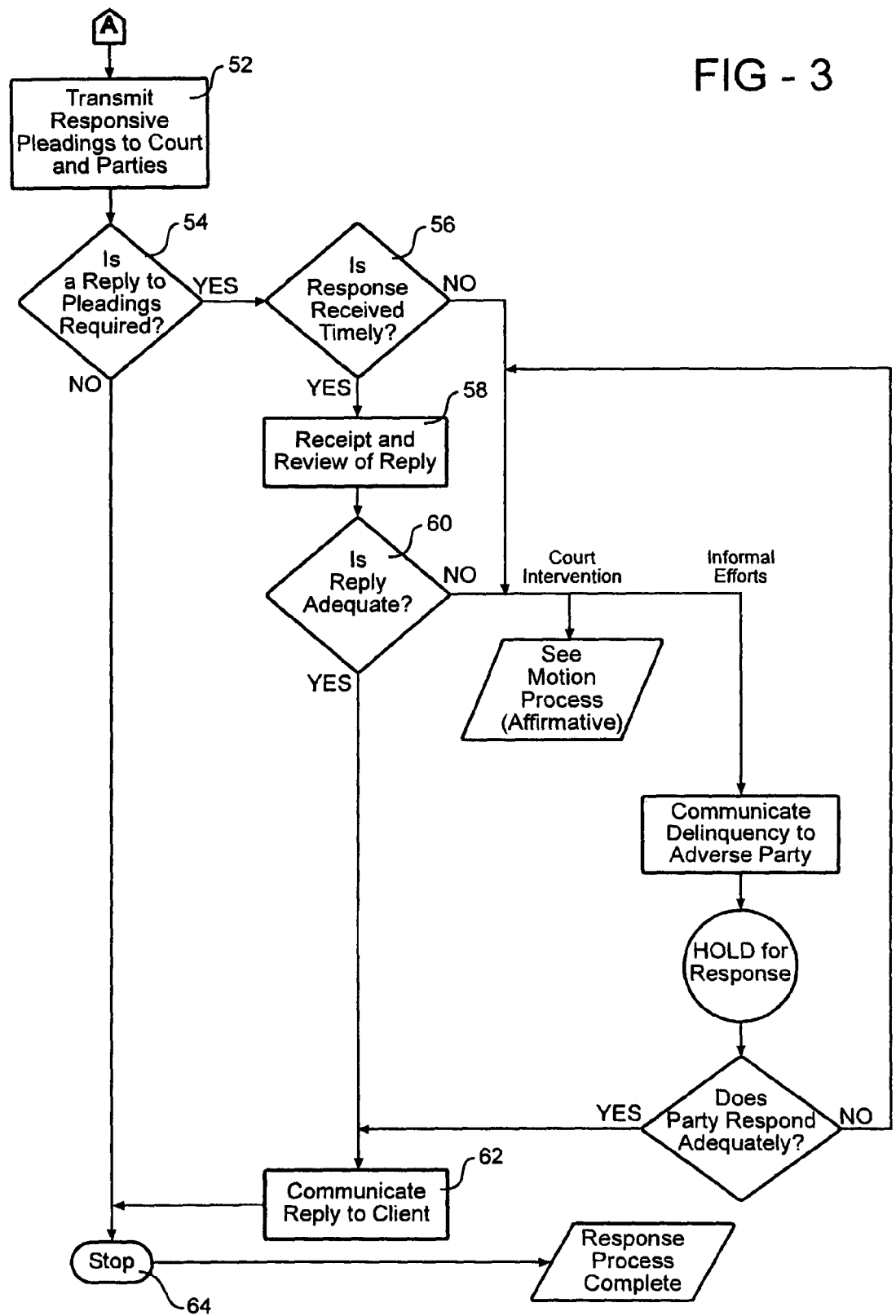
FIG. 3 illustrates the second part of the process map for responding to a complaint.
Figure 4:
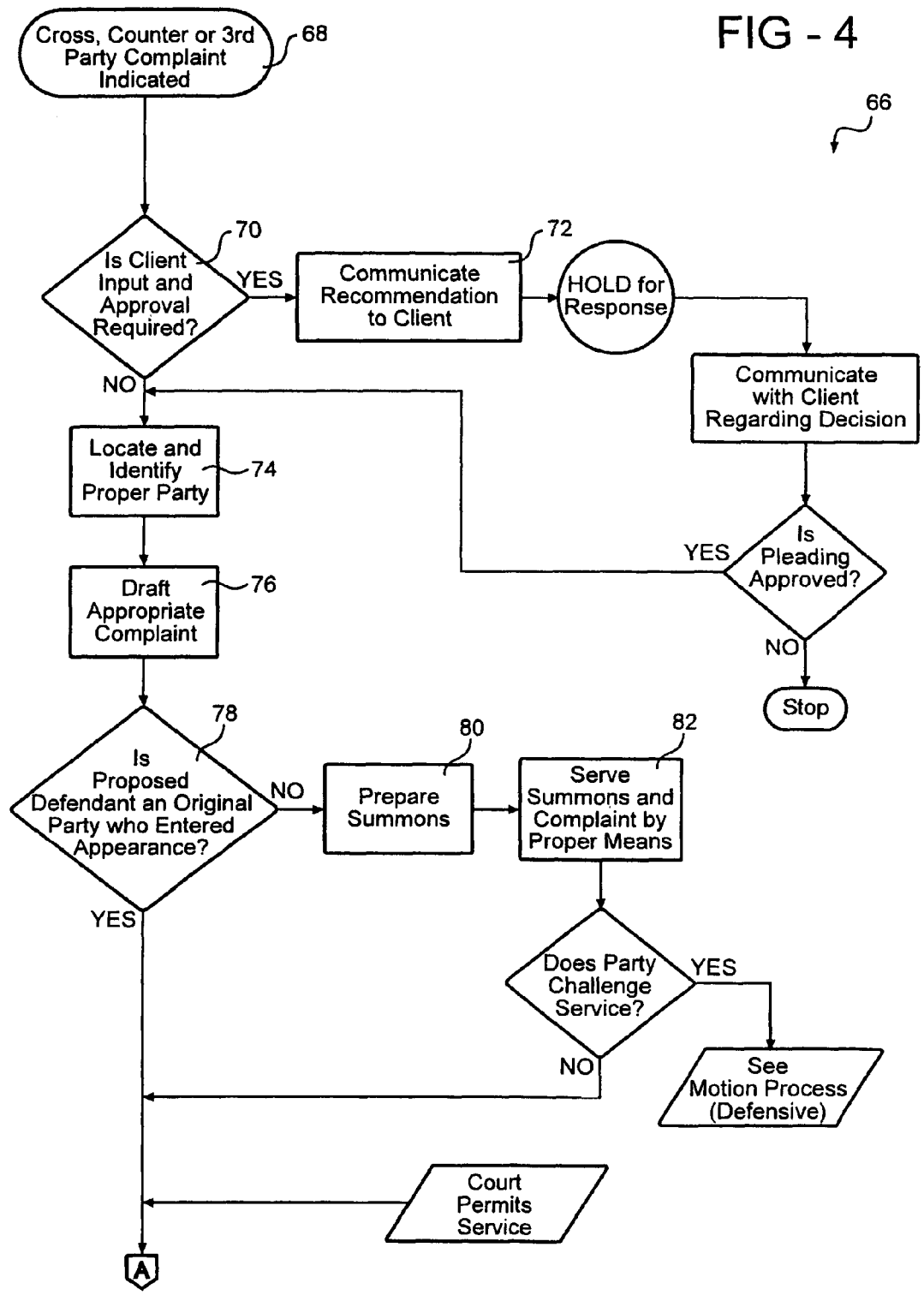
FIG. 4 illustrates a process map for preparing and filing a cross complaint.
Figure 5:
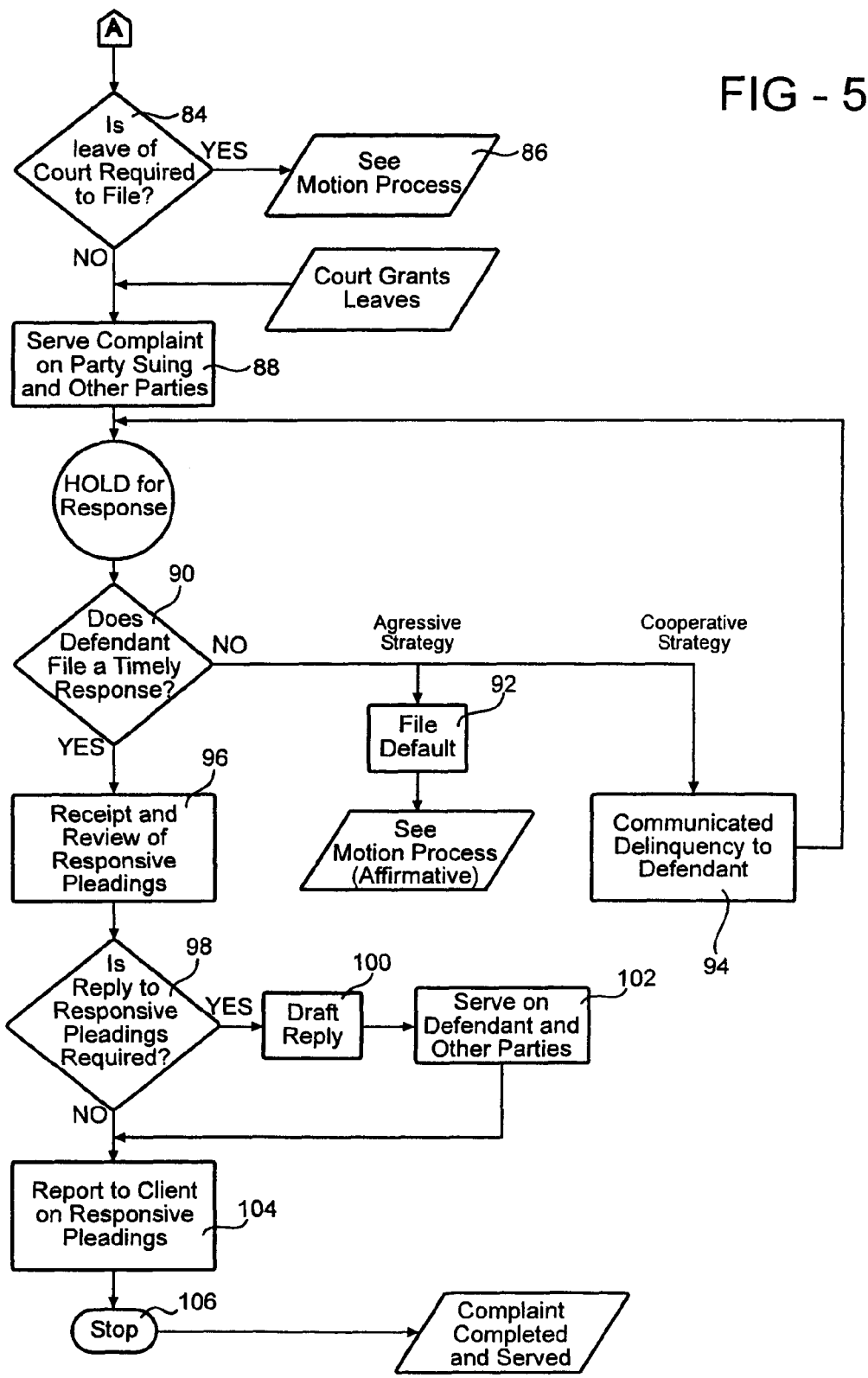
FIG. 5 is the second part of the process map for filing a cross complaint.
Figure 6:
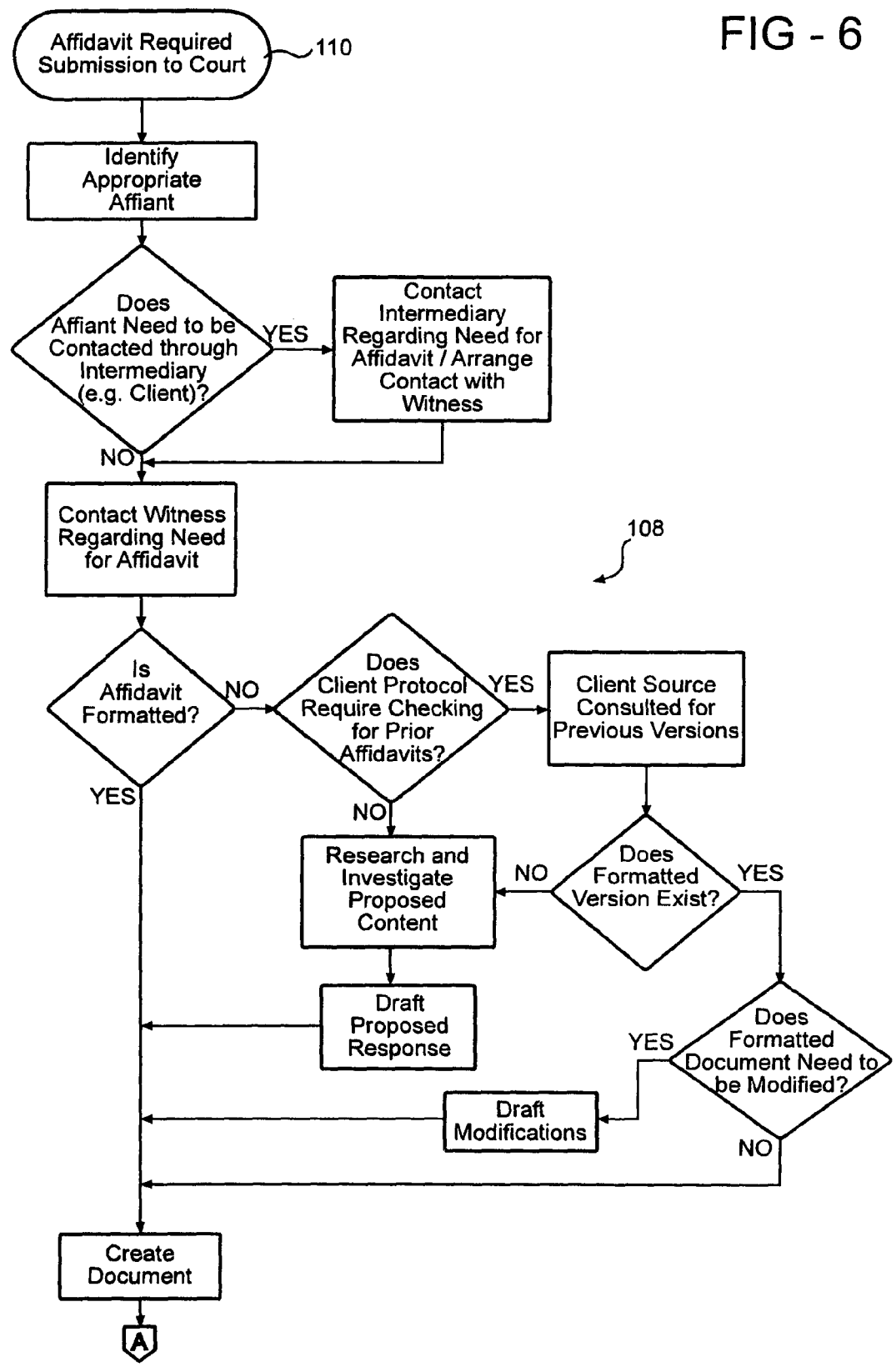
FIG. 6 is a process map for preparing an affidavit.
Figure 7:
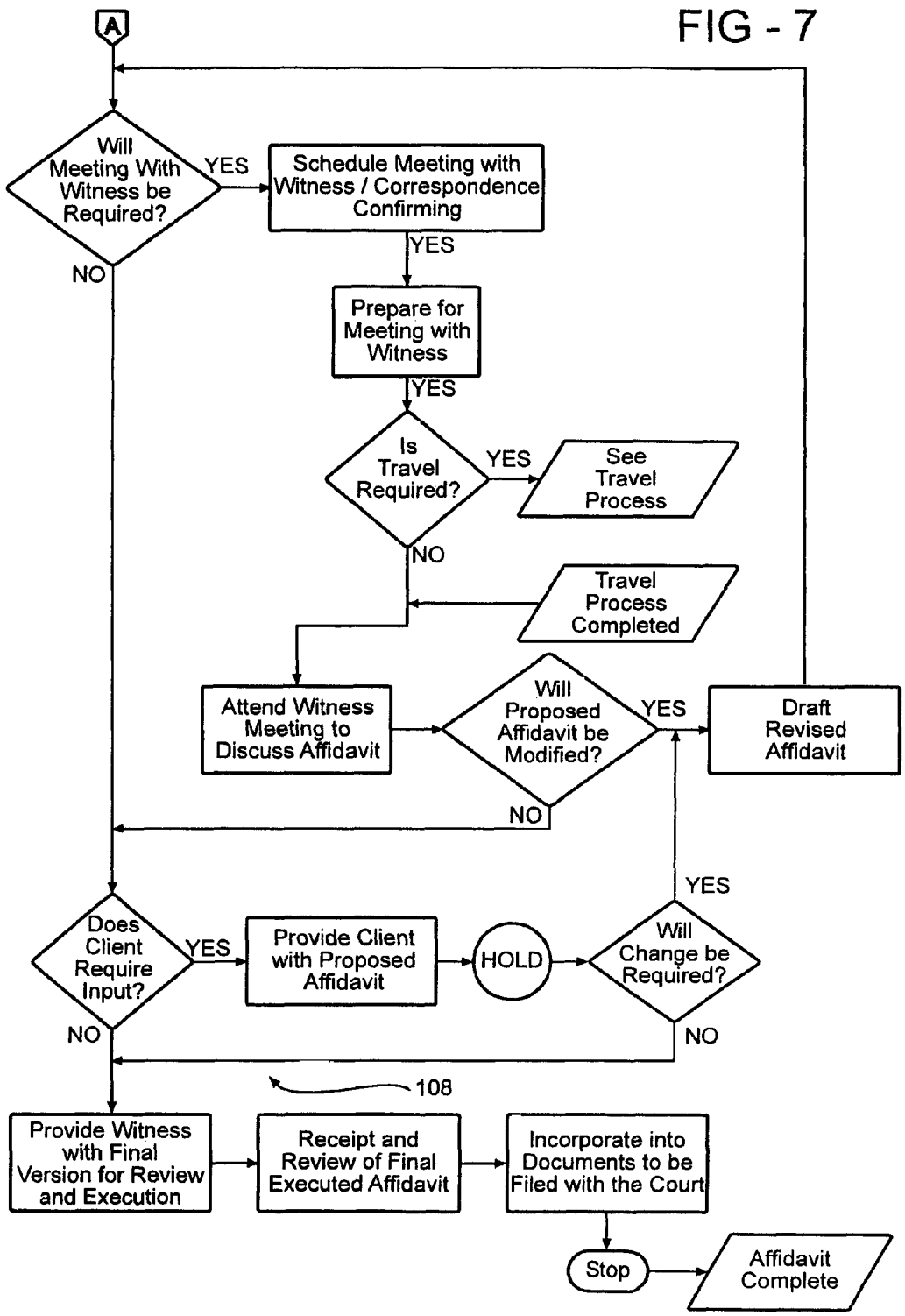
FIG. 7 is the second part of the process map for preparing an affidavit.

The process maps module 12 includes over 30 different maps of the litigation process. A few of these process maps are shown in FIGS. 2-7. The process maps represent the steps involved in a particular task, for example responding to a complaint as shown in FIGS. 2 and 3, or preparing a cross-complaint as shown in FIGS. 4 and 5 or the steps for preparing an affidavit as shown in FIGS. 6 and 7. The present system 10 has in it a map of every task of the litigation process and they are placed in a database where they can be called upon at the outset of the case by corporate counsel. Each task has a value assigned to it so that a budget can be created. The present invention includes the following process maps that are available to corporate counsel which are utilized for budgeting and cost management purposes.

(Commencement of Actions/Pleadings)
1. Responsive Pleadings and Third Party Practice.
2. Federal Court Removal Process.
3. Cross, Counter and/or Third Party Complaint.

(Motion Practice)
4. Motion Practice (Affirmative).
5. Motion Practice (Defensive).

(Discovery Directed to Other Parties)
6. Interrogatories (Affirmative).
7. Depositions By Oral Testimony.
8. Depositions On Written Questions.
9. Requests For Production.
10. Requests To Admit.
11. Requests For Examination Of Third Party Or Premises.
12. Compelling Production Of Documents And Things From Non-Parties.
13. Meeting With Witness Who Is Not An Expert Or The Client.

(Discovery Directed to Client)
14. Interrogatories.
15. Depositions By Old Testimony.
16. Depositions On Written Questions.
17. Request For Production Of Documents And Things.
18. Requests To Admit.

(Investigation)
19. Research Technical And Background Information
20. Meeting With Client And Prospective Witnesses.
21. On-Site Inspection Off Premises.

(Other Activities)
22. Offer Of Judgment (Affirmative)
23. Offer Of Judgment (Defensive)
24. Drafting Affidavit.
25. Evidentiary Hearing.
26. Pretrial And Settlement Conferences.
27. Expert Witnesses.
28. Witness Preparation.

(Resolution Efforts)
29. Mediation/Facilitation Efforts.

The Cost Management System 10 is capable of utilizing yet other process maps that could be added to the System. These process maps are in the system 10 but can be modified by corporate counsel in order to tailor fit the expected process for a particular piece of litigation. Thus, the System is flexible in that it can be modified in order to manage cost of any type of litigation.

FIG. 2 depicts a process map 12 for the steps involved with, outside counsel responding to a Complaint 28. The first step is to receive and review 30 the complaint and ascertain whether pre-answer actions 32 are appropriate. If action is necessary, then actions such as removal to Federal Court 34, filing a motion to dismiss 36, can take place. Counsel can also file an appearance 38, or, if insurance or a third party may be responsible, the defendant could tender a defense 40 at which time future work would stop 42 if the defense is accepted. A party may also obtain an extension of time 44 in order to proceed onward with the case.

FIG. 3 illustrates yet additional steps for responding to the complaint which includes transmitting 52 the responsive pleading to the court. Once that is done, a determination 54 must be made as to whether a reply to the pleading is required, and, if so, a decision 56 is made as to whether a response is timely received. If it has been timely received, then it is reviewed 58 and a determination 60 is made as to whether the reply is adequate. If it is adequate, then it is communicated 62 to the client. Thereafter, the process for responding to the complaint is stopped 64. No further action is taken on this process map. Thereafter, the billing attorney in charge of this customer can go to the billing module 20 and click send the invoice which will automatically invoice corporate counsel for this work that has been completed. It will be appreciated that the point and click process can be done at any pre-described task segment within each given process.

FIGS. 4 and 5 illustrate a process map 66 for preparing a cross-complaint, counter-complaint or third-party complaint 68. First a decision 70 is made as to whether client input is necessary and if so, the client is informed 72. If client input is not required, then it is necessary to locate and identify the proper party 74, draft the appropriate complaint 76 and then a decision 78 must be made as to whether the proposed defendant is an original party. If not, then a summons 80 must be made and served 82. If the proposed defendant is an original party, then a decision 84 as to whether leave of court is made, and, if so, then the motion practice module 86 is selected. If leave of court is not required, then the complaint is served 88 and the parties wait to determine whether defendant files a timely response 90. If the defendant does not file a timely response, then a default is filed 92 or communication 94 is made with the opponent. However, if the answer is received 96, then a decision 98 is made as to whether any responsive pleadings must be drafted 100 and served 102 on the defendant or the other parties. However, if no responsive pleading is required, then the status is reported 104 to the client where this process is then completed and stopped 106. This summarizes the individual tasks that are encountered when preparing, filing and processing a cross-complaint. Once this work is done, the billing system module 20 can be accessed by the billing attorney, and an invoice can automatically be generated and sent electronically to corporate counsel, to his accounting department, through the internet or some other electronic means. The appropriate personnel can bill completed segments as the work is finished without waiting for the entire responsive pleading practice being completed.

FIGS. 6 and 7 illustrate the process map 108 for creating an affidavit 110. The individual tasks are set out in the flow charts depicted in FIGS. 6 and 7. Each individual action task has a pricing value with a range associated with it. During the budgeting process, these values are input or activated by corporate counsel in order to generate a proposed budget. It will be appreciated that similar types of process maps are created for each of the other above-mentioned litigation processes. The process maps illustrated in FIGS. 2-7 are merely representative of the process maps utilized by the system 10 which would be of similar logic as the one disclosed herein, but specifically tailored for their particular litigation process.

Figure 8:
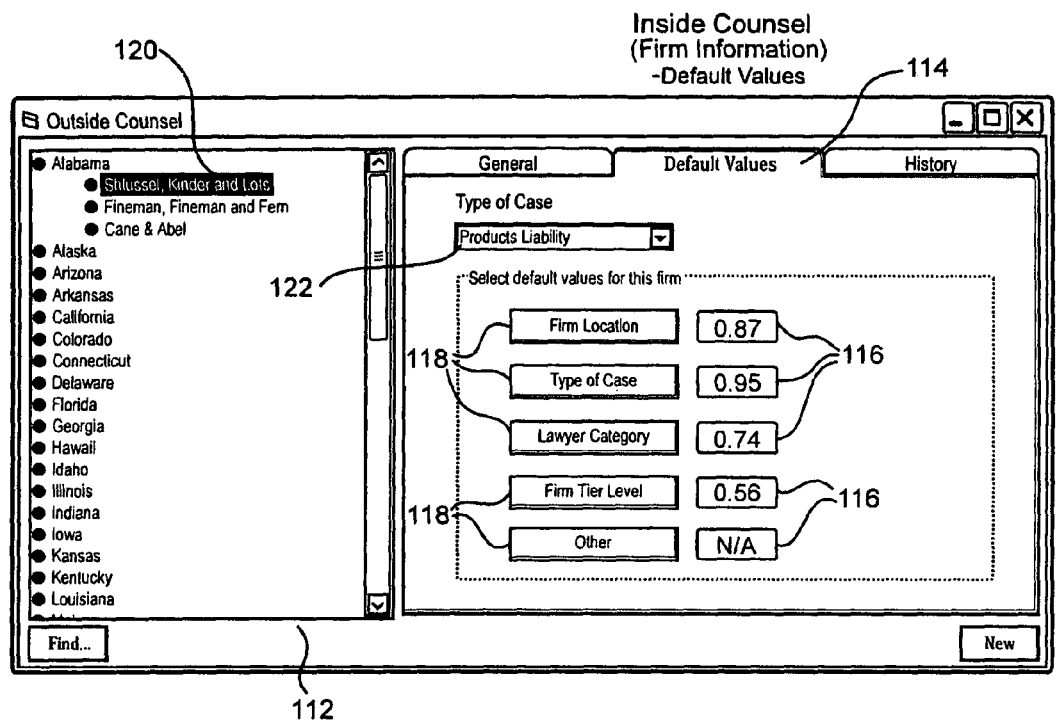
FIG. 8 illustrates an output from the computer screen illustrating the default values tab selected.
Figure 9:
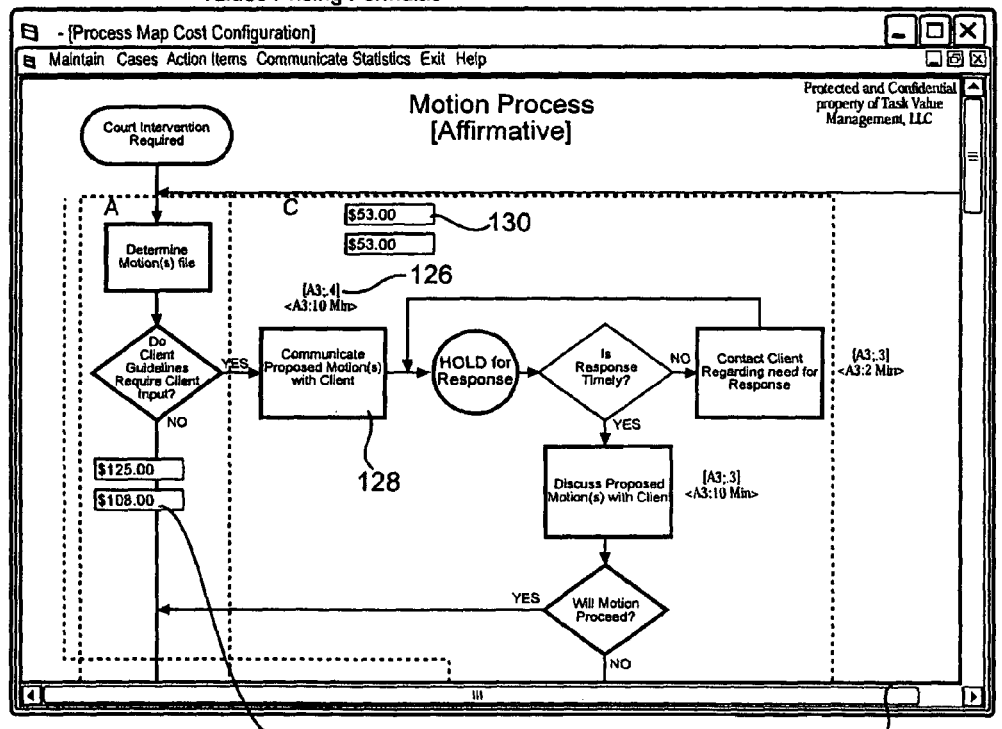
FIG. 9 illustrates a screen output from the litigation cost management system, illustrating the pricing control chart ranges.

FIGS. 8 and 9 depict screens from the setting pricing variables and defaults module 14 of the cost management system 10. FIG. 9 shows the baseline of the values in the system 10. The formula used to establish the baseline values could consider factors such as task description, level of expertise, normal hourly rates, time required to complete a certain task and the value of the task. These baseline values can be changed by adjusting the default values, which is done by going to screen 112 of FIG. 8. The default values shown in FIG. 8 can be preset for a particular law firm once it is in the system. A formula can be used to compute the default values once a certain firm and type of case is selected. These factors allow for adjustment of the base line numbers in order to generate an accurate budget. Alternatively, individual tasks can be given a set price and they are placed into task value segments which allow for discrete billing. The defaulting values that appear once a firm is selected can be modified by corporate counsel, which adds flexibility to the system.

From the user's perspective, the management system 10 has windows that only corporate counsel can see and windows that outside counsel can see. FIGS. 8 and 9 illustrate screen outputs from the pricing variable/defaults module 14 that corporate counsel will see when it enters the case information into the system. With respect to FIG. 8, the inside counsel will see a screen 112 with a general tab, a default values tab and a history tab. When the default value tab 114 is selected, values 116 are already preset in the firm location, type of case, lawyer category, firm tier level and other categories 118. These values can be changed by corporate counsel if the defaults are not acceptable. These values are based upon inside counsel selecting a particular firm 120 in the pull down menu on the left hand side of the screen. As law firms are added to the system 10, the database will include the information necessary to complete the categories 118. The purpose of the categories 118 is to take into consideration standard features that are inherent with the type of case 122 and venue. The default values are factored in when creating the case budget. These default values 114 can be modified by corporate counsel. These types of parameters assist corporate counsel in standardizing the system 10 and to maintain continuity in the budgeting process.

The firm location category takes into consideration whether the case is pending in New York, Omaha, or some other city. The higher the value, the more likely it is pending in a big city such as New York. The type of case category 122 places a higher value on intellectual property cases and a lower value on cases such as workers' compensation. The other categories, such as lawyer category, firm tier and other, provide additional factors for corporate counsel to take into consideration when creating a budget.

FIG. 9 illustrates a screen shot 124 of the process map for filing a motion with the value pricing baseline data 126 illustrated for each task to be completed in that process. This is one of the aspects of the present invention as it allows corporate counsel to specifically price each particular task 128 in the process map. Here, ten minutes is allotted for the task communicating proposed motion with client 128 and a specified attorney is designated for this task. The default values 114 are already preset, and a $53 amount 130 appears on screen 124 so that corporate counsel can see the actual targeted cost of that particular task. In this instance, there is no variance as $53 is the set amount. Alternatively, a variance 131 can be provided by corporate counsel. Thus, the system 10 is flexible in its pricing structure. Pricing baseline data 126 is provided for each action step that is set out in the process map and collectively are accumulated with all other maps within the system 10 in order to generate a proposed budget. Corporate counsel may go to the screen, change the values that are in the pricing baseline data 126 so as to adjust the value for a given task 128. Corporate counsel sets these formulas or variables for each of the process maps prior to the case budget being submitted to outside counsel. Modifying variables allows the client the flexibility to give ranges to each task. It will be appreciated that at the discretion of inside counsel, no range can be assigned, but instead, a fixed value for each task can be input.

Each task can have a dollar range 130 associated with it to provide upper and lower control limits for a particular event. As long as outside counsel stays within these control limits, the system 10 can automatically approve any invoice regarding performance of such task. Alternatively, corporate counsel could require everything to be approved. Also, corporate counsel can track where outside counsel performs within this range, so as to compare a particular law firm to other firms. This type of data is generated by the statistical reports module 24.

Figure 10:
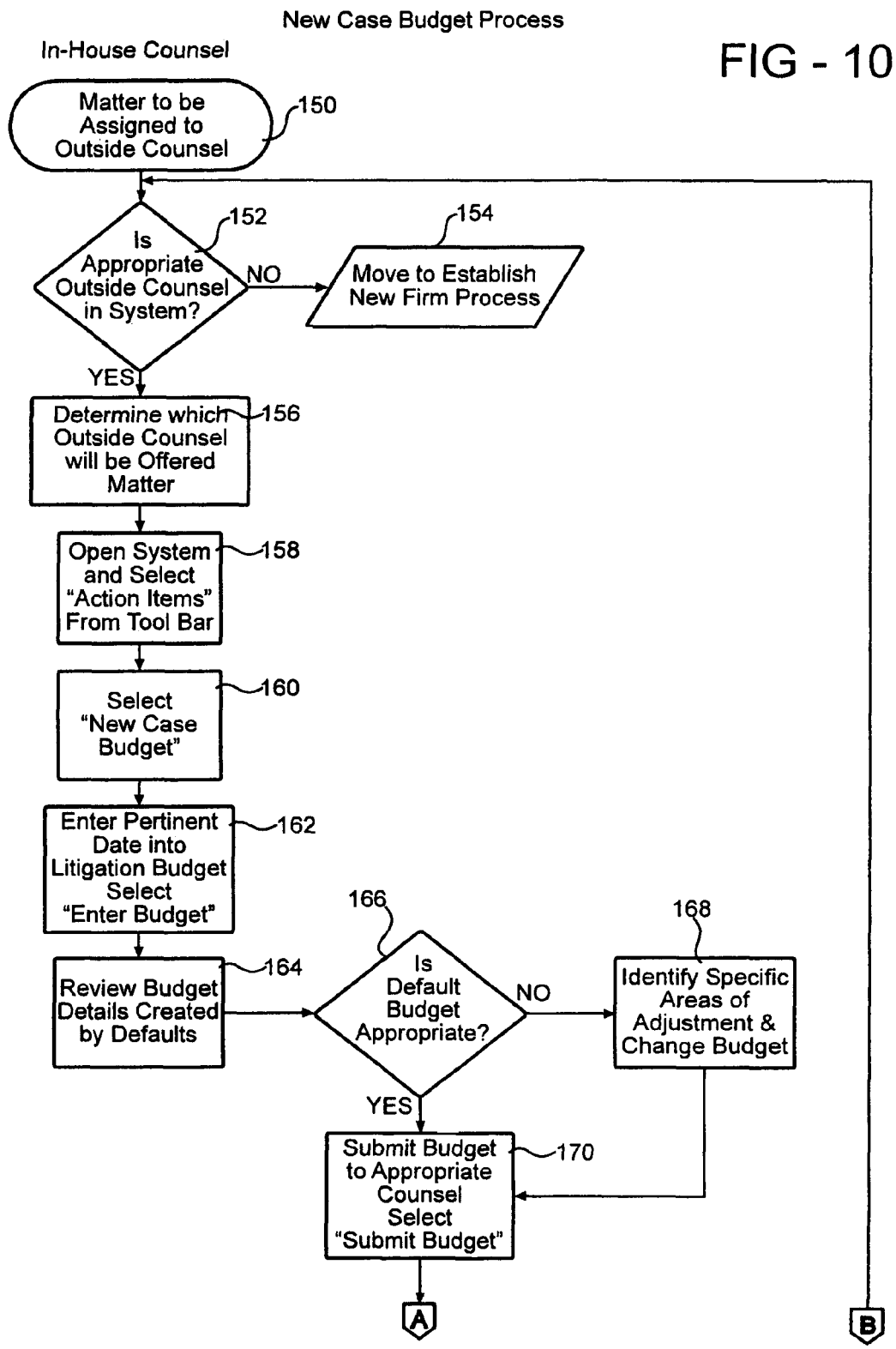
FIG. 10 illustrates a flow chart that shows the steps in-house counsel goes through when generating a new case budget.
Figure 11:
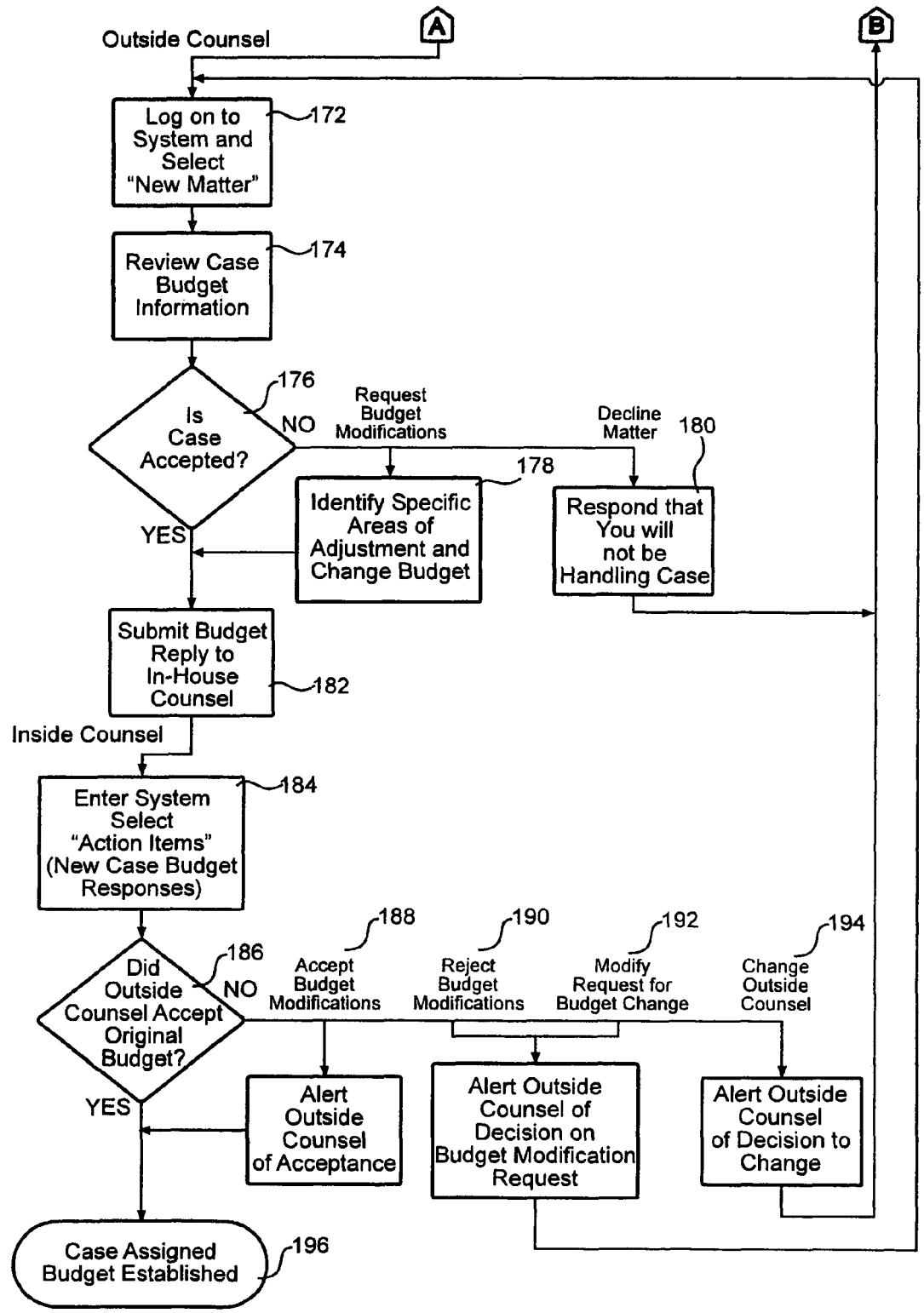
FIG. 11 is a continuation of the steps in-house counsel goes through when developing a new case budget.

FIGS. 10 and 11 illustrate the steps corporate counsel goes through in order to establish a case budget 16. FIGS. 12 and 13 illustrate a budget litigation worksheet screen that inside and outside counsel use when creating a new case budget. It will be appreciated that this is merely representative of the various screens that either counsel may see.

FIG. 10 illustrates the steps that corporate counsel goes through in order to set up a new case budget. First, in-house counsel ascertains whether the matter is to be sent to outside counsel 150. A decision 152 is made as to whether outside counsel is currently in the system and, if not, it must be placed into the system 154. If they are in the system, then it must be determined 156 which outside counsel to refer the matter to. Once that is done, outside counsel begins the process by starting the cost management software and then clicking on the action items 158 toolbar and selecting a new case budget window 160. Once the window is open, corporate counsel enters pertinent data into the system and then hits the enter budget button 162.

Next, corporate counsel reviews the budget details that are created by the defaults 164 and makes a decision 166 as to whether the budget is appropriate and if it is not, then the budget is changed 168. However, if the default budget is appropriate, then the budget is submitted 170 to outside counsel.

FIG. 11, illustrates the steps associated with outside counsel reviewing the proposed budget. This is accomplished with outside counsel logging on 172 to the system and selecting the new matter button. Outside counsel now reviews 174 the case budget information and ascertains 176 whether it is acceptable. If it is not acceptable, then modifications 178 can occur or the matter can be declined 180 by outside counsel. However, if the case is accepted, then the budget is submitted back to corporate counsel 182.

Inside counsel now goes to the action items tab and clicks on new case budget responses 184. A decision 186 is then made as to whether outside counsel accepts the original budget, and if not, outside counsel may consider alternative actions such as accepting the modified budget 188, or rejecting the budget modifications 190, or modify the request for budget change 192 or to change outside counsel 194. Alternatively, if the original budget is accepted, then the case is assigned 196 and a budget is established.

The above steps set forth in FIGS. 10 and 11 show the entire process of establishing a new case budget. This becomes the roadmap for all future work that is done on this particular case. Exceptions, of course, can be provided and are discussed in the Exceptions module 12.

FIG. 12 illustrates the screen 198 the in-house counsel sees at the step of submitting the budget 170. The budget worksheet identifies in fields the particular name of the plaintiff 200, the date of the purported injury 202, the location of the lawsuit 204, the name of the outside counsel 206 that has been identified in step 156 as the proposed counsel, the date the complaint was filed 208 and the type of case that is at issue 210. It will be appreciated that this screen can have other categories other than those set forth herein. If the type of case has been done before, and the pricing is in the system 10, then the counsel hits the enter budget button 211 and all of the defaults that are stored in the system are used to generate a budget. After it is generated, corporate counsel then may tailor fit the default budget for a particular type of case. To modify the default budget, corporate counsel, for example, may hit an ABA task 212 that she wants to modify and a screen pops up. The screen, for example, allows for additional tasks to be added which in turn allows the default budget to generate a new budget specifically designed for a particular case.

Columns are provided that describe the task description utilizing the ABA codes 212 which provide default descriptions of the work to be selected by outside counsel. Fees and expenses are added to create the proposed budget 218 by in-house counsel. The budget is transmitted to outside counsel by pressing the submit button 170.

Figure 14:
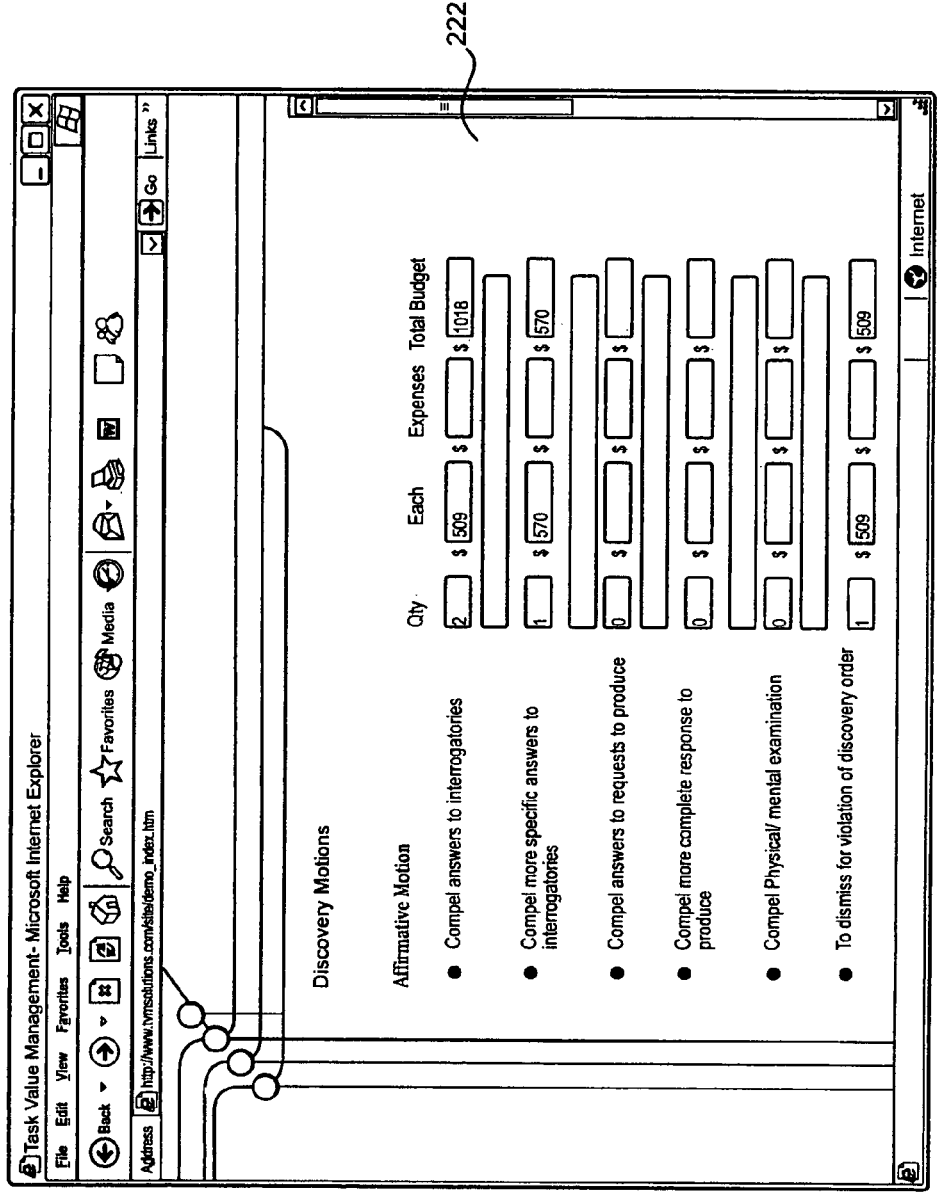
FIG. 14 illustrates a screen output from the litigation cost management system from the outside counsel's viewpoint, showing changes that have been made to the budget using this screen.

FIG. 13 illustrates the screen 220 seen by outside counsel once the budget has been submitted to him. Outside counsel can accept or reject or revise the budget. If they wish to revise the budget, they go to screen 222 (FIG. 14) and click on the proper ABA code, adjust the quantity of the process to be performed and the system 10 changes the pricing once the screen 222 is closed. Next the new budget numbers are reflected on the bottom of the screen 220 of FIG. 13. The submit button is then pressed and inside counsel sees screen 226 of FIG. 15 which shows the changes that were made to the original budget. When this process is completed, corporate counsel closes screen 226, which causes the budget to be finalized.

FIG. 15 illustrates a screen 226 that inside counsel sees once the new proposed budget is sent from outside counsel. The original budget 228 is illustrated next to the new budget 230. Inside counsel can accept 232, modify 234 or reject 236 the budget and resend it to outside counsel. The budget can be adjusted by going back into a screen similar to that shown in FIG. 14. After the adjustments are made, the revised budget can be resent to outside counsel.

The case status module 18 of the system 10 provides various screens 238 for providing information to corporate counsel. FIG. 16 illustrates a screen 238 that corporate counsel reviews in order to check the status of an existing case within the system 10. From the screen 238, counsel can select specific cases in order to obtain real time information on any particular case the company is monitoring, as long as the data for that case has been put into the system 10. The cases illustrated in FIG. 16 are merely exemplary.

FIG. 17 illustrates a screen output 240 that outside counsel sees which shows the current status of a particular case. From the screen 240, outside counsel can ascertain the amount remaining in the budget 242 and compare that to the original budget. This is presented in a form of a budget and litigation worksheet 244 which summarizes all expenses and fees to date for that particular case.

Figure 18:
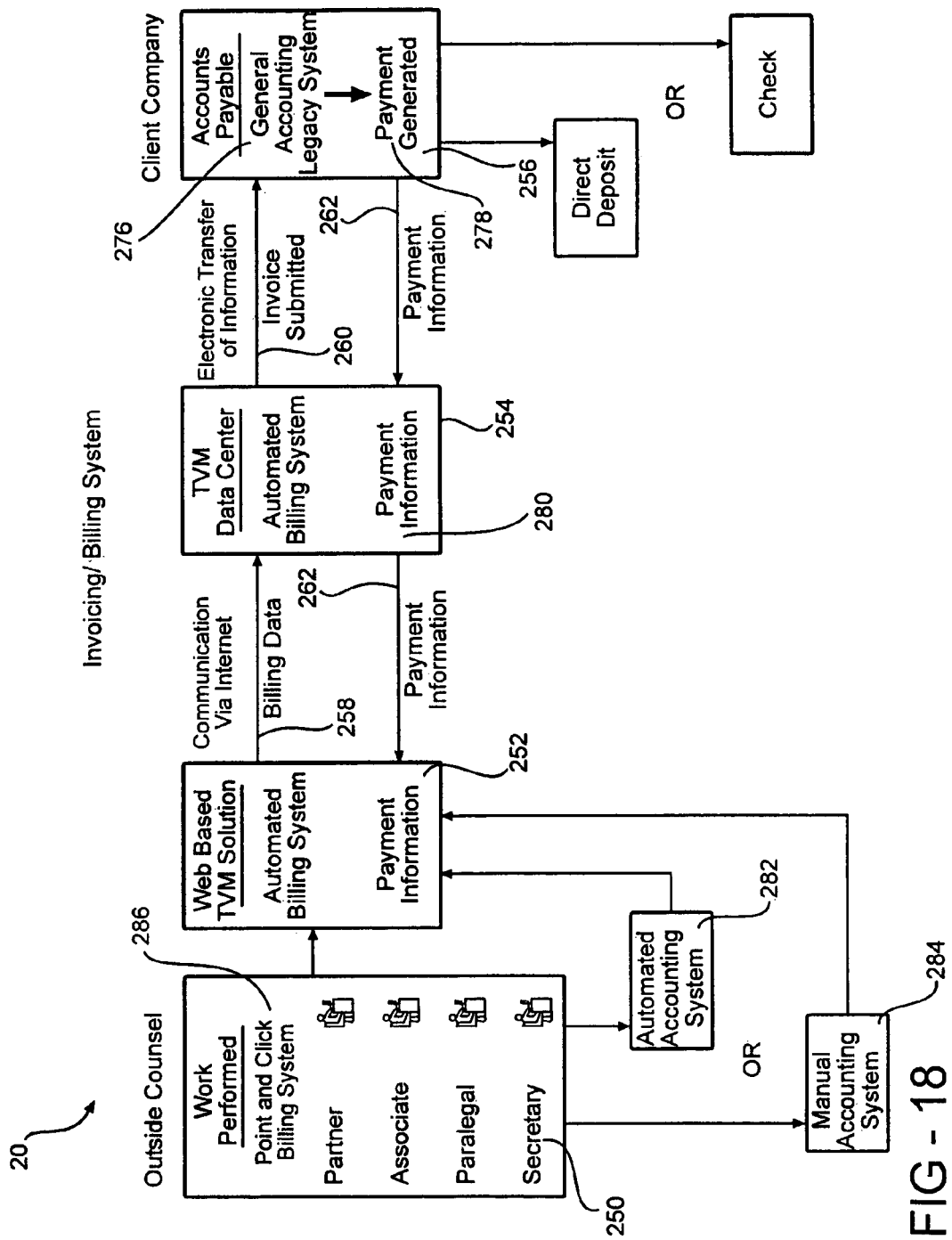
FIG. 18 illustrates a work flow diagram of the invoicing/billing system of the present invention.

FIG. 18 represents the billing system module 20 which is an automated process that minimizes steps outside counsel must take in order to get paid. The billing system module 20 includes a work performed segment 250 and a web based segment 252, a data center 254, and an accounts payable segment 256. The segments are connected and allow the free transfer of information, such as billing data 258, submission of invoices 260 and payment information 262.

Figure 19:
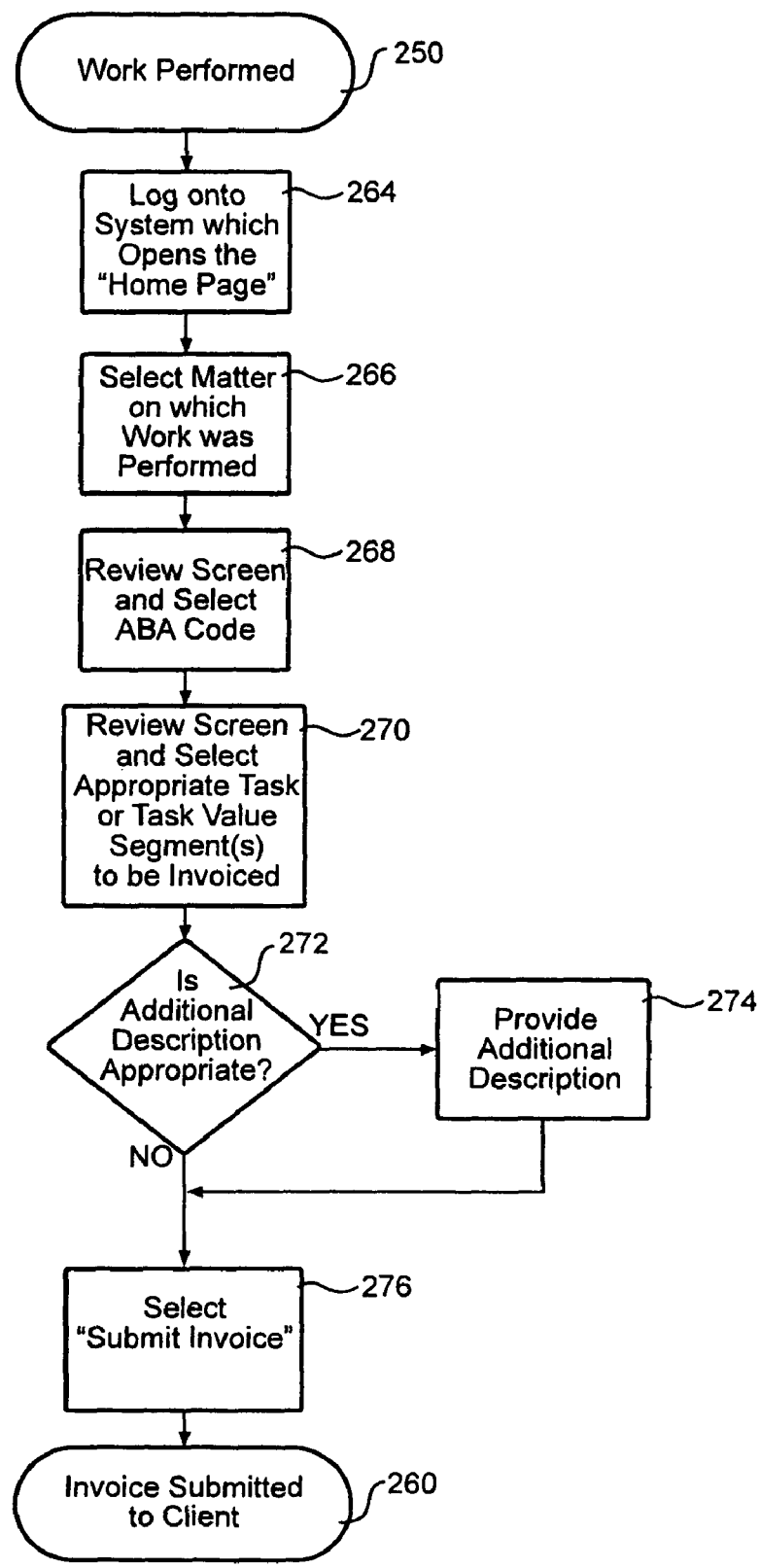
FIG. 19 illustrates a work flow diagram from the outside counsel's perspective of the billing/invoicing process.

FIG. 19 is a flow diagram showing the steps outside counsel goes through in order to submit invoices to corporate counsel. To start the billing the work performed segment 250, first, the attorney logs into the system and opens the home page 264. Once opened, the attorney selects the matter 266 on which work has been performed, reviews the screen and selects the ABA code 268 for the work that has been completed. The appropriate task segment, or segments, is then selected.270, within a particular ABA code and that represents work that was done on a particular process such as a motion, deposition, etc. Next, the attorney must ascertain whether an additional description 272 is required and if so, an additional description is provided 274. If no additional description is required, then the attorney hits the submit invoice tab 276 and the invoice is then submitted to the client 260. The invoice then goes to the corporation's general accounting system 276 where payment is generated 278 by either direct deposit, or by check. Information regarding the payment 262 is transmitted back through the data center 254 where it is processed and historical payment information 280 is generated. That payment information 266 is then sent back to the web segment 252 for distribution to the in-house counsel's automated accounting system 282 or a manual accounting system 284. Thus, outside counsel's accounting system 282 is capable of communicating via internet or some other electronic transfer means, for example satellite, to the company's accounting system 276. Thus, real time payment information 262 flows between the company and outside counsel, allowing either to have accurate information on payment status.

The data center 254 is operable to house all of the data for a particular client/company and acts as the hub for every law firm in the system 10 to funnel its billing and payment information therethrough. The data center 254 is operable to sort and generate the statistical reports for reporting module 24 and becomes a tool for corporate counsel to monitor all costs running through the system 10.

The web segment 252 is the porthole through which a particular law firm transmits its billing data to the company's data center 254, and it receives payment information 262 back from the data center 254. The point and click billing system 286 standardizes the inputting of the work that has been performed by simply clicking on the ABA code as discussed in FIG. 19 and then drilling down to the particular task that has been completed.

Figure 20:
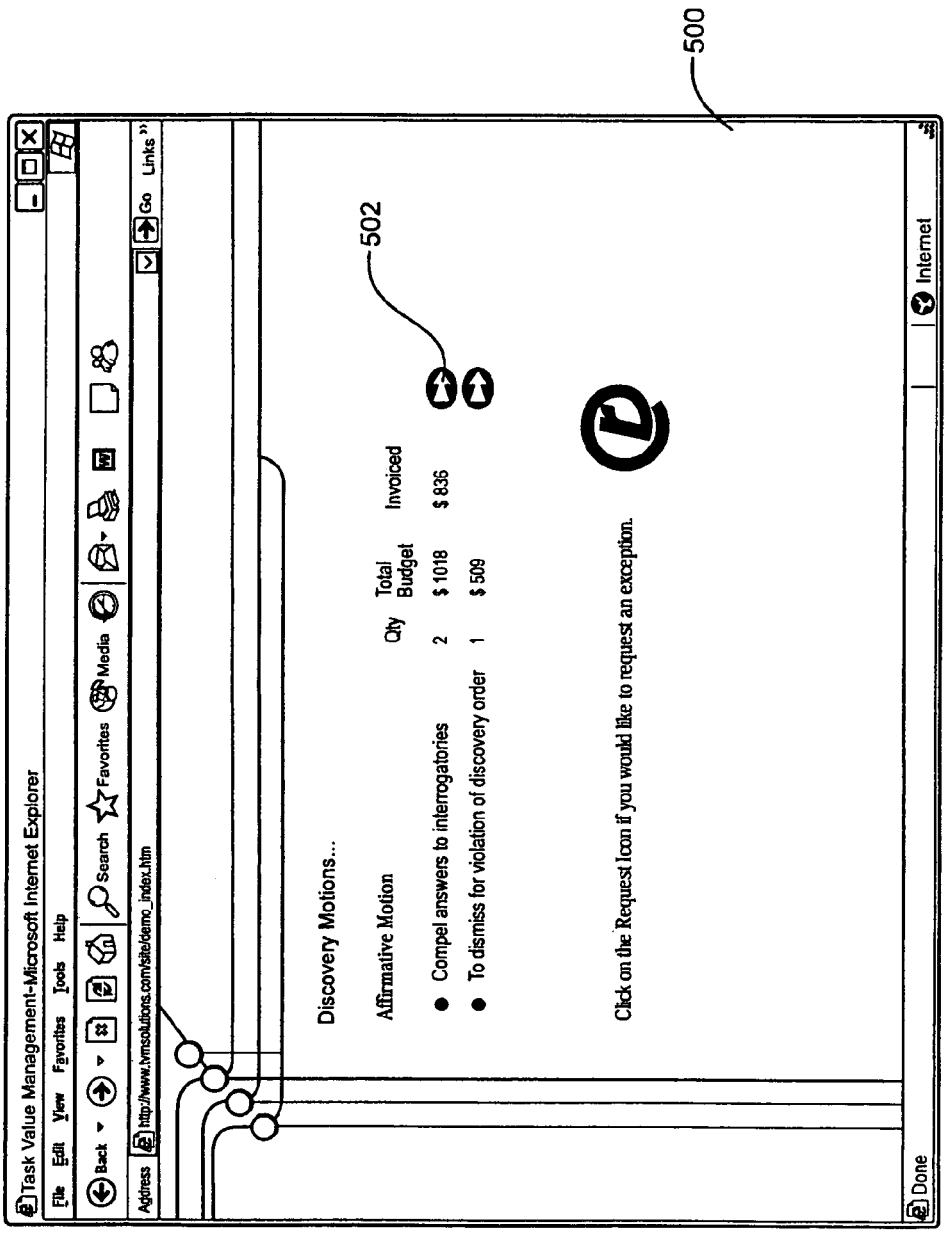
FIG. 20 is a screen outside counsel sees when beginning the point and click billing process.
Figure 21:
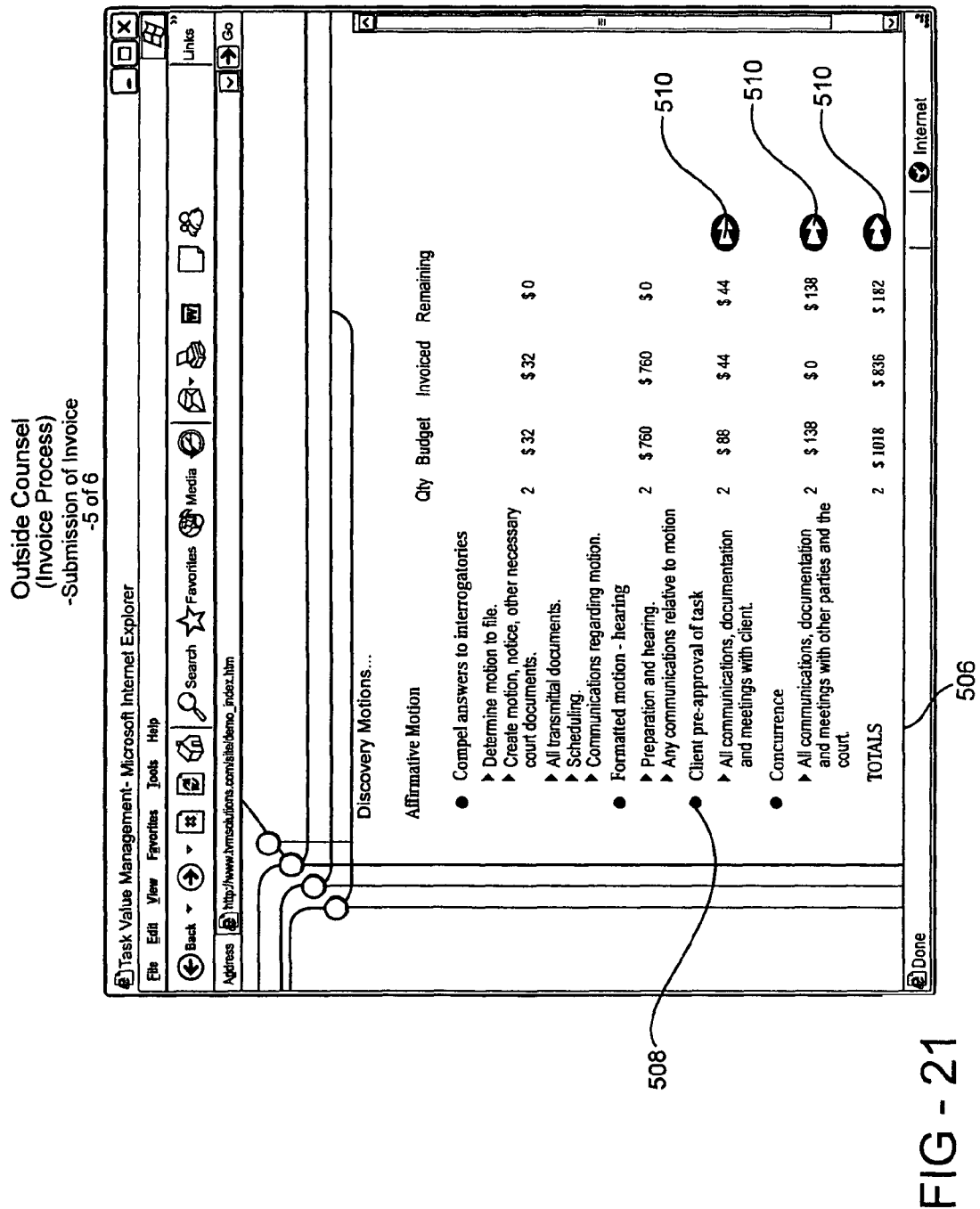
FIG. 21 is another screen outside counsel sees when billing a particular task.
Figure 22:
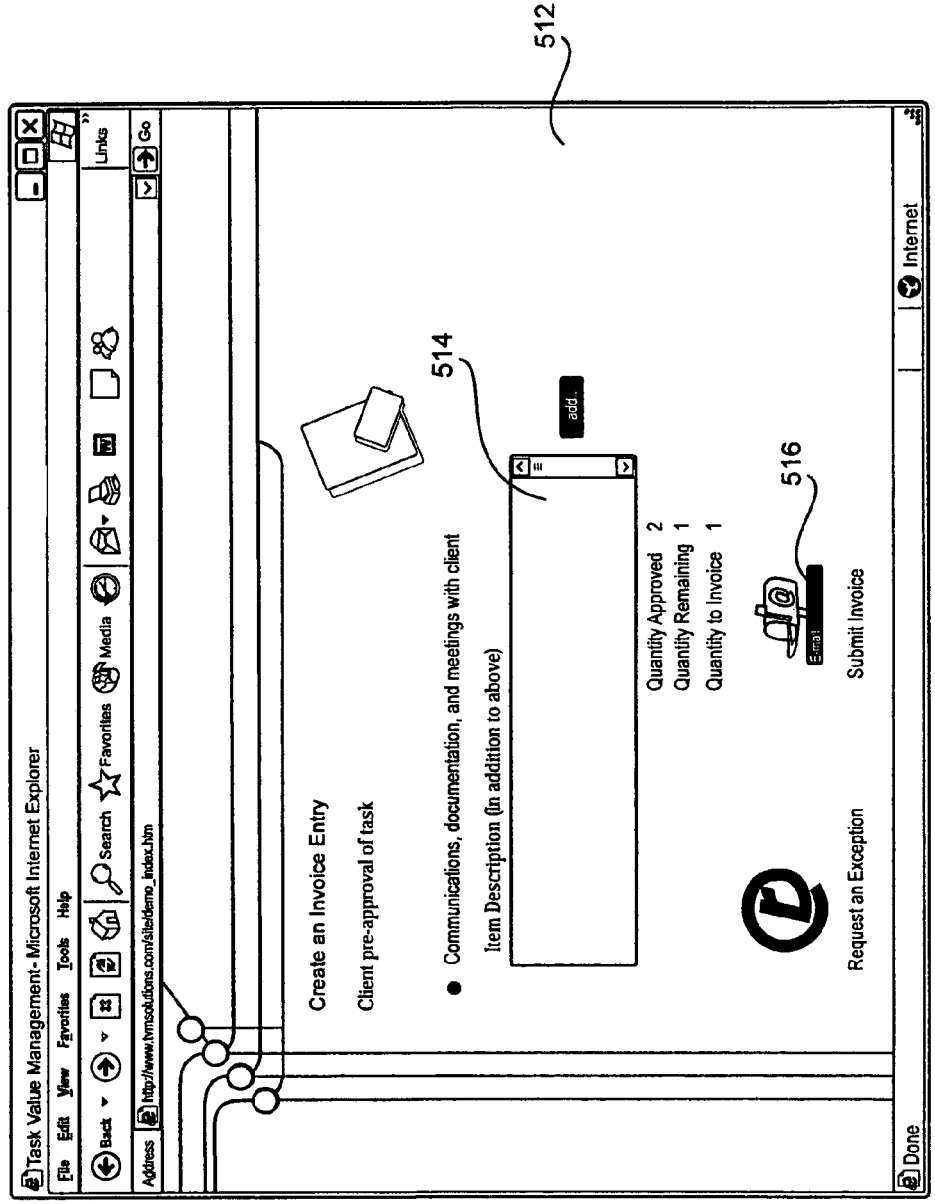
FIG. 22 is the screen outside counsel sees in order to submit an invoice to corporate counsel.

FIG. 20 illustrates a screen 500 that the billing attorney will see when a process has been completed and the task is ready to be billed. Here, arrow 502 is hit which takes counsel to screen 506 of FIG. 21. Then, a specific task 508 that has been completed can be selected and billed by hitting arrow 510 causing screen 512 to appear (FIG. 22). An additional description 514 can be added if desired. Otherwise, submit invoice button 516 is hit causing an invoice to be electronically transmitted as depicted in the FIG. 18 diagram.

Figure 23:
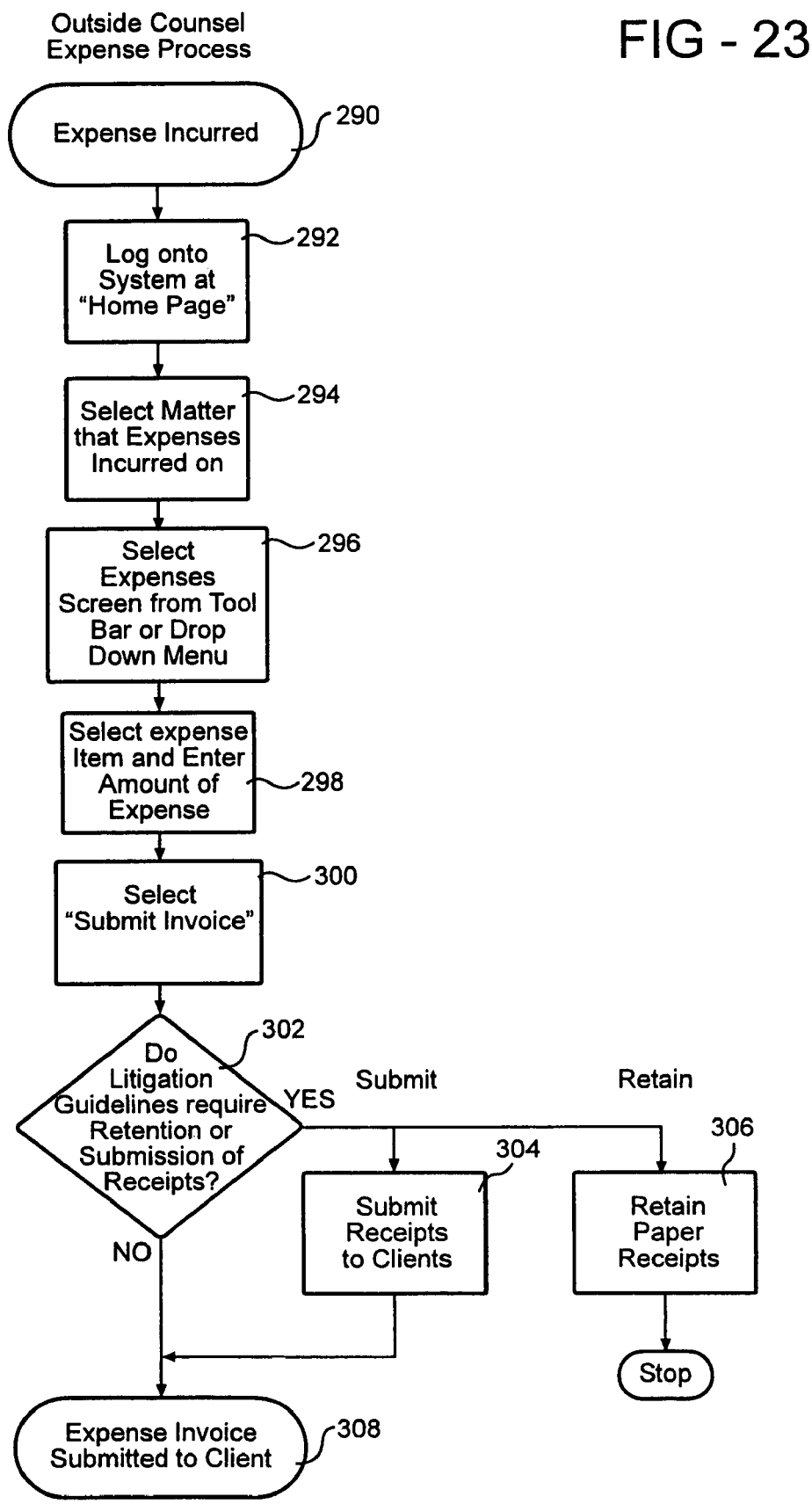
FIG. 23 is a work flow diagram from the outside counsel's perspective, of the expense invoicing process.

FIG. 23 illustrates a workflow diagram for outside counsel to enter into the system 10,the expenses 290 that have been incurred. First, outside counsel logs onto the system home page 292 and selects the matter that the expense occurred in 294. Next counsel selects the expense screen 296 from the tool bar or from a pull-down menu and selects the expense item 298 and enters the amount of the expense. The submit invoice button 300 is clicked on and then the attorney must make the decision as to whether the litigation guidelines require a receipt 302, and if so, then it will be submitted 304 to counsel or retained 306, depending on the circumstances. If there is no retention policy on receipts then the expense invoice is submitted to the client 308. The expense invoice is processed through the billing system module 20 as set forth in FIG. 18 and the payment is generated 278 as discussed above. The expense information is stored in the data center 254 for later statistical analysis and processing.

Figure 24:
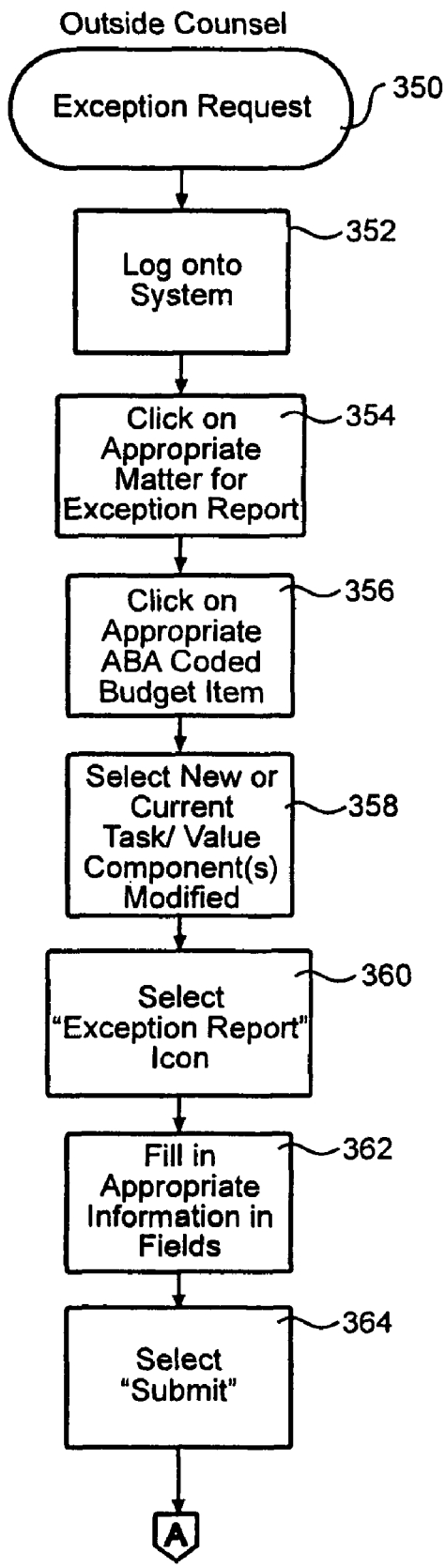
FIG. 24 illustrates a work flow diagram of the exception request process from the perspective of outside counsel.

With reference to FIG. 24, the exceptions module 22 provides for modification of the existing case budget when new tasks are to be performed. For example, an unplanned event during the course of litigation may arise as a result of the court sua sponta issuing an order. In such an instance, an exception request 350 would be generated and outside counsel would log on to the system 352, click on the appropriate matter for the exception 354, click the appropriate ABA coded budget item 356 and select a new task 358. It will be appreciated that the value of a task can be modified, for example if it adds an increase in value to a task that is already in the system. Counsel then selects the exception report icon 360 and fills in 362 the appropriate information in the fields and then selects the submit tab 364 for sending the exception request to inside counsel.

Figure 25:
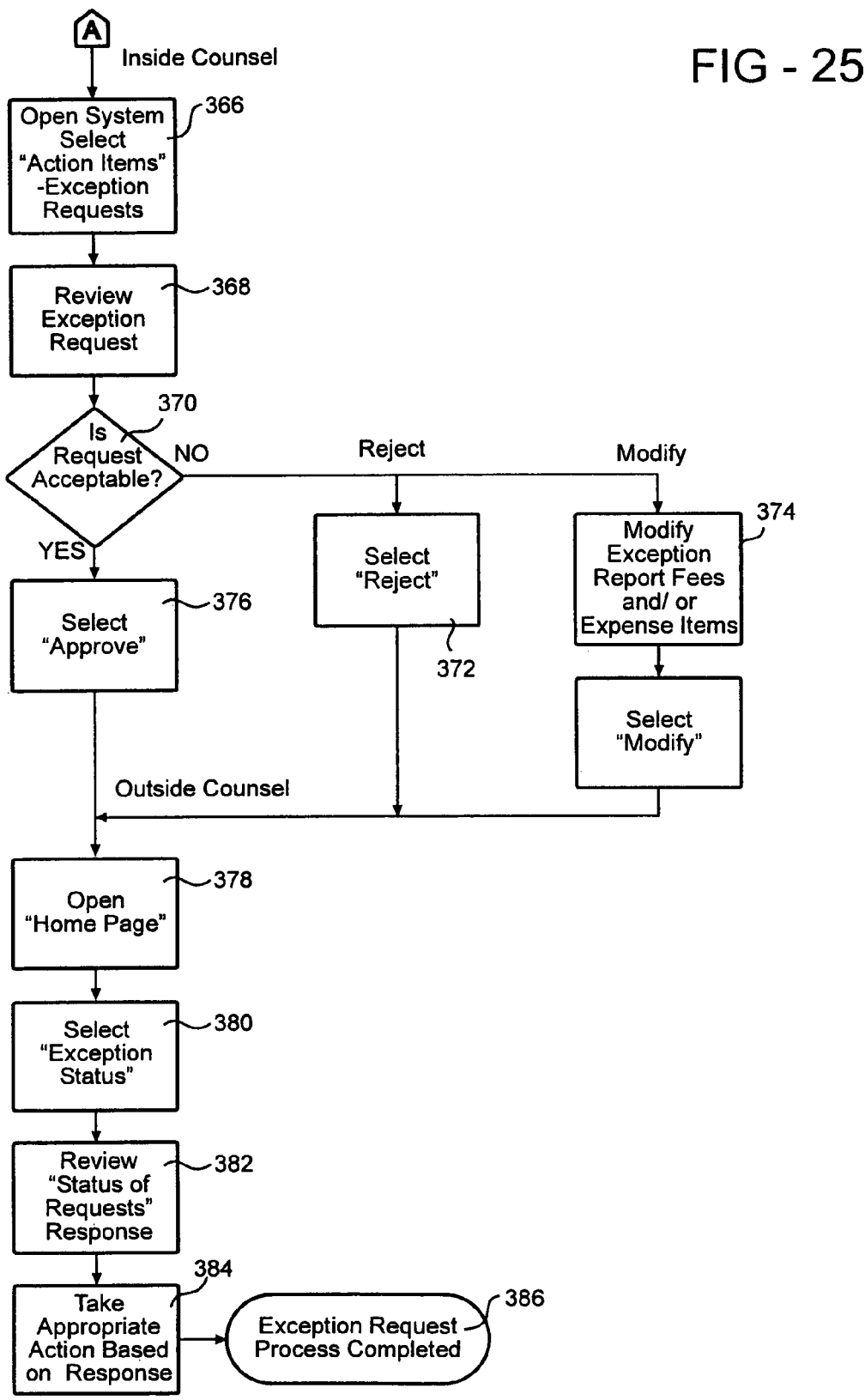
FIG. 25 illustrates the exception request process from the perspective of corporate counsel.

FIG. 25 illustrates the steps for processing the exception request from corporate counsel's viewpoint. Here corporate counsel opens the system 10 and selects the action items exception request button 366. The request is reviewed 368 and corporate counsel must now consider 370 as to whether to reject 372 or to modify 374 the request. However, if counsel approves the request then the approve button 376 is selected sending a communication back to outside counsel of her decision. Outside counsel then opens the home page 378 and selects the exception status tab 380 and reviews 382 the status of the request. Outside counsel then takes the appropriate action based upon the response 384 and completes the task, if authorized. The exception request process is now completed 386 and can now be billed utilizing the billing module 20 as discussed above. It will be appreciated that corporate counsel may create an automatic cost approval range and as long as outside counsel's request falls within that range, then the request can be automatically approved.

Figure 26:
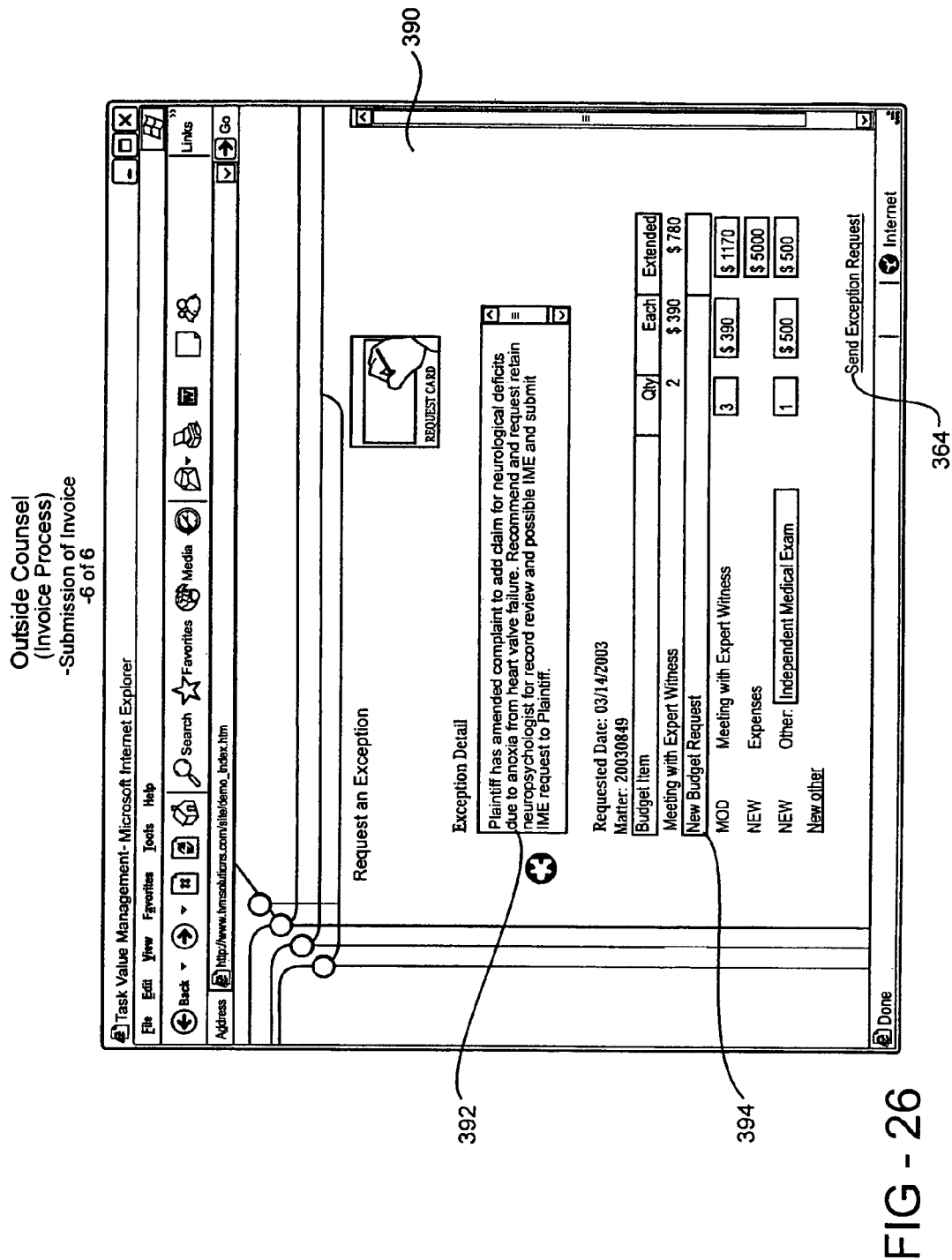
FIG. 26 is a screen output of the litigation cost management system from outside counsel's perspective, showing the exception that has been requested.

FIGS. 26 and 27 illustrate screen outputs of what outside and inside counsel review when going through the exception request process as outlined in FIGS. 24 and 25. Specifically, FIG. 26 is a screen output 390, from the perspective of outside counsel, which allows outside counsel to describe the exception in detail 392 and provide a new budget request 394. In this instance, the new budget request asks for two meetings with an expert witness, an expense of $5,000 for the expert witness, and an independent medical exam expense of $500. Once outside counsel has completed inputting the data in screen 390, the send button 364 is hit which in turn sends a request to corporate counsel.

FIG. 27 depicts the screen 400 inside counsel sees after an exception request is submitted. This is also shown as review exception request 368 in the FIG. 25 diagram. Inside counsel can now read outside counsel's narrative 392 of what has caused the exception and the recommended course of action. The cost of the new task is set out under the requested budget section 402 and it is compared to the previously agreed to budget 404. At this time, corporate counsel can deny the request 372, approve the request 376 or modify the request 374. The screen 400 also allows corporate counsel to review the entire budget 406 or close the window or move to the next item.

Figure 28:
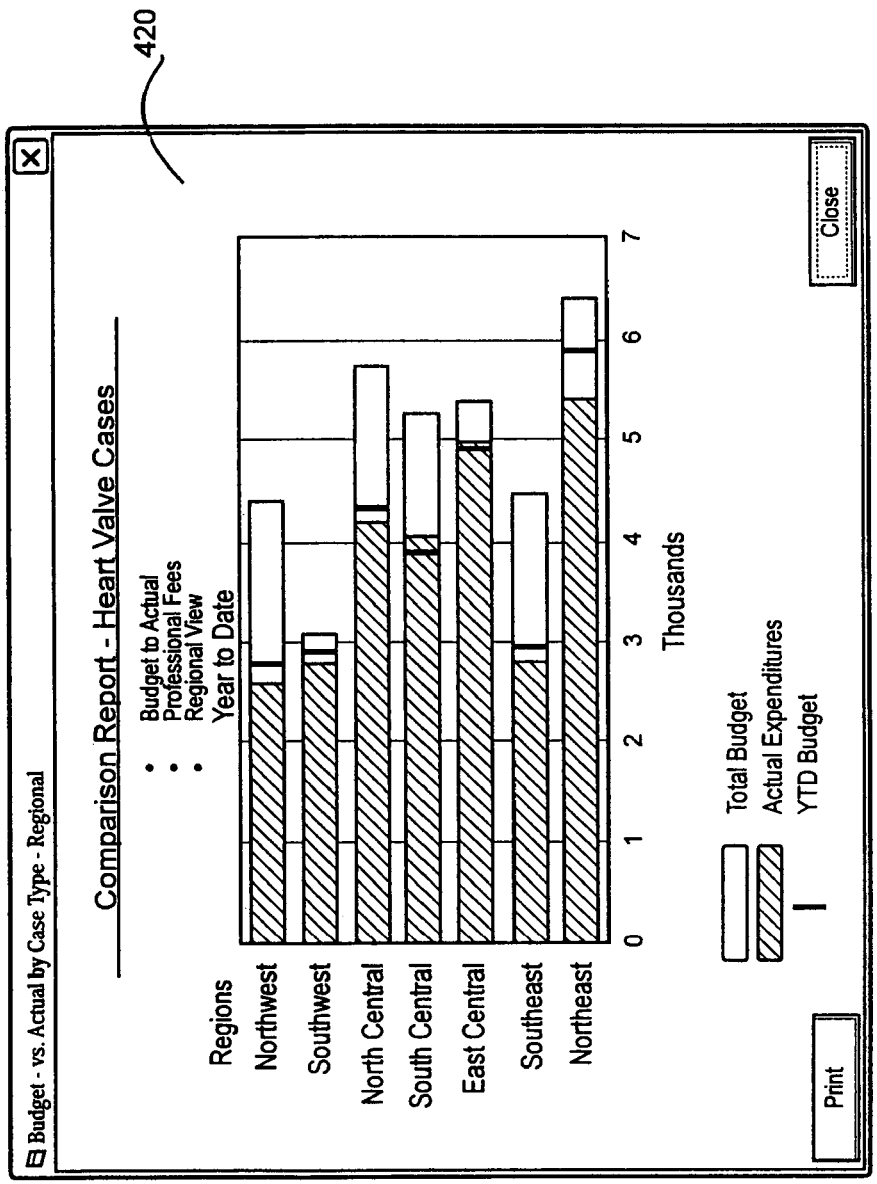
FIG. 28 illustrates one type of statistical report that the present cost management system can generate.

The statistical reporting module 24 is a tool used by corporate counsel in order to compare requests, current budget, and numerous other information that is stored in the date center 254. FIG. 28 illustrates one type of physical data output by a screen 420 showing a comparison report in heart valve cases throughout the various regions of the United States. The year to date budget amount is shown compared to actual expenditures. This allows corporate counsel to assess, at any given time, the costs in a particular type of case that is a heart valve case, throughout the United States.

It will be appreciated that numerous other reports can be generated. This is accomplished by clicking on a statistics tool bar and clicking on either standard reports or custom reports. Some of these standard reports include exception requests by region, exception requests that were granted by region, cost of exception requests by region and analysis of certain types of cases by specific law firms in certain regions of the country. Specific law firm data can be prepared to see which attorneys in a law firm are billing the most. A report can even be generated to find out specific fees and costs for a particular task or case. This and numerous other types of standard reports are available in the system 10 for corporate counsel to review.

The incentives module 26 allows corporate counsel to reward law firms that provide exceptional services, for example, a law firm that creates a new strategy for handling a case that will save the company money. Further, counsel can be awarded a bonus when a winning motion is created that successfully terminates the case early. Because the system 10 controls the budget and it can be determined at any time where one is relative to the budget, a bonus can be easily determined. Thus, corporate counsel can reward a law firm for a new innovative approach. It should be appreciated by those skilled in the art that other variations to the preferred embodiments to the present invention, beyond those mentioned above, are possible. Accordingly, it is to be understood that the protection sought and to be afforded hereby should be deemed to extend to the subject matter defined by the Claims below, including all varied equivalents thereof.

What is claimed is:

1. A computer based method that allows a client to control and manage the cost of a lawsuit independent of hourly rates comprising the steps of:
    a) Selecting pre-established process maps each consisting of individual tasks to be done in the lawsuit;
    b) setting pricing and value variables for each individual task to be done which eliminates hourly rates in said method;
    c) the client establishing a lawsuit budget by individual task which an outside counsel must follow;
    d) providing a case status module with real time information on how the lawsuit is proceeding based upon individual task performed;
    e) providing a point and click billing module for automatically submitting invoices to the client, the invoices having amounts that equal the value variables for individual tasks that have been pre-established and performed; and
    f) providing an exceptions module to allow for automatic approval or denial of new work submitted by outside counsel to be done that is beyond the budget.

2. The method as claimed in claim 1, further comprising the step of providing statistical reporting to the client, whereby data is stored and statistical information is generated using the data on all outside counsel for exact task cost comparison.

3. The method as claimed in claim 2, wherein the step of providing statistical reporting includes graphically outputting historical information based on data that is generated by said method.

4. The method claimed in claim 1, wherein the step of selecting process maps includes selecting each anticipated task of the lawsuit and using the process maps that are in the system.

5. The method as claimed in claim 1, wherein the step of creating process maps includes identifying each individual task to be performed in the lawsuit and inputting the level of expertise of the person who will be doing each task.

6. The method as claimed in claim 1, wherein the step of setting price and value variables includes the client establishing limits for each task to be performed.

7. The method as claimed in claim 1, wherein the step of setting price and value variable includes the client inputting upper and lower control limits for each task.

8. The method as claimed in claim 1, wherein the step of setting price and value variables includes inputting into a data base firm name, location, type of case, and type of lawyer.

9. The method as claimed in claim 1, wherein the step of establishing a budget includes the client generating values for each individual task, the client electronically submitting the budget to outside counsel, and the outside counsel either accepting or rejecting the budget by a submission back to the client.

10. The method as claimed in claim 9, wherein the step of rejecting the budget includes allowing outside counsel to generate a counterproposal budget by adjusting the individual tasks and electronically submit same to the client.

11. The method as claimed in claim 1, wherein the step of providing a case status module includes providing a client with current information on status of a particular lawsuit by transmission of such information over the internet.

12. The method as claimed in claim 1, wherein the step of providing a point and click billing module includes inputting the work that has been completed into a computer by clicking an ABA code representative of the work area completed, clicking on the specific pre-approved task that has been performed, clicking on a tab to bill it, and automatically sending a bill via internet to a client.

13. The method as claimed in claim 1, wherein the step of providing a point and click billing module includes electronically sending a pre-approved non-hourly based bill to a customer once the task has been completed, and the client electronically or manually causing payment to outside counsel.

14. The method as claimed in claim 1, wherein the step of providing a point and click billing module includes requiring a firm to electronically bill a customer once a pre-approved task is performed.

15. The method as claimed in claim 1, wherein the step of providing an exceptions module includes allowing outside counsel to electronically submit requests for approval of new work that is not in the actual budget, and allowing a client to approve, modify or reject the request.

16. The method as claimed in claim 1, wherein the step of providing an exceptions module includes outside counsel submitting a request for new work, and approving the request if it is within a previously set default pricing variable.

17. The method as claimed in claim 1, wherein the step of providing an exceptions module includes allowing a client to obtain current status of prior exceptions requests.

18. The method as claimed in claim 1, further comprising the step of providing incentives for exceptional performance by outside counsel, electronically notifying outside counsel of the exceptional performance, and compensating outside counsel.

19. A client controlled litigation cost management system comprising:
    a module that maps out in detail the tasks, decision points and litigation variables for the process of litigation;
    a module for assigning dollar values to each task of the process;
    a module for inputting pre-approved dollar values for each task to be charged by counsel; and
    a module for imputing other information.

20. A cost control and management system for assisting in-house counsel in reducing litigation cost comprising:
    a real time analysis module that is operable to inform in-house counsel in reducing litigation cost;
    a real time budget and cost to complete module that is created by in-house counsel; and
    an exception module that is operable to permit outside counsel to request to modify the budget when a task outside of the budget arises, said in-house counsel being operable to deny said request, if the request is approved, the budget is revised.

21. A point and click litigation cost management system that is created and then controlled by a customer comprising:
    an input module for entering work that has been completed by a firm and generating an invoice;
    a transfer device for communicating the invoice to the customer;

a processing department operated by the customer that is operable to receive the invoice from the transfer device; and a means for transmitting payment information to a firm.

22. The cost management system as claimed in claim 21, further comprising a means for providing exceptions requests to the budget through electronic submission by the firm to the customer.

23. The cost management system as claimed in claim 22, further comprising a module for tracking each exception that is requested, so as to make decisions based on a litigation process that is consistent for all outside law firms.

24. A system of a law firm and corporate counsel managing the cost of litigation for a case comprising:

the corporate counsel generating an actual working budget based on defaults and price variables;

the actual budget being electronically submitted to a law firm;

the budget being approved, rejected or modified by the law firm;

the case proceeding based upon an agreed upon budget; and the law firm electronically requesting exceptions when a task is outside of the agreed upon actual budget, said corporate counsel either accepting or rejecting the exceptions.

* * * * *